(12) United States Patent
Seo et al.

(10) Patent No.: US 12,444,540 B2
(45) Date of Patent: Oct. 14, 2025

(54) MULTILAYER ELECTRONIC COMPONENT WITH CURVED SIDE SURFACES

(71) Applicant: SAMSUNG ELECTRO-MECHANICS CO., LTD., Suwon-si (KR)

(72) Inventors: Chang Ho Seo, Suwon-si (KR); Sung Kwon An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 135 days.

(21) Appl. No.: 18/079,449

(22) Filed: Dec. 12, 2022

(65) Prior Publication Data
US 2023/0207221 A1    Jun. 29, 2023

(30) Foreign Application Priority Data

Dec. 28, 2021    (KR) .................. 10-2021-0189812
Aug. 1, 2022    (KR) .................. 10-2022-0095543

(51) Int. Cl.
*H01G 4/30*        (2006.01)
*B23K 26/38*       (2014.01)
*H01G 4/012*       (2006.01)

(52) U.S. Cl.
CPC .............. *H01G 4/30* (2013.01); *B23K 26/38* (2013.01); *H01G 4/012* (2013.01)

(58) Field of Classification Search
CPC .......... H01G 4/30; H01G 4/012; H01G 4/224; H01G 4/12; H01G 4/232; H01G 13/00; B23K 26/38; B23K 2101/36; B23K 2103/52; B23K 26/032
See application file for complete search history.

(56) References Cited

U.S. PATENT DOCUMENTS

| | | | |
|---|---|---|---|
| 2005/0081987 A1 | 4/2005 | Takahara et al. | |
| 2014/0209363 A1* | 7/2014 | Oh ........................ | H01G 4/12 361/301.4 |
| 2014/0318843 A1* | 10/2014 | Han ...................... | H01G 4/232 361/301.4 |
| 2015/0075854 A1* | 3/2015 | You ....................... | H01G 4/35 361/275.1 |

(Continued)

FOREIGN PATENT DOCUMENTS

| | | | |
|---|---|---|---|
| JP | 2003051425 A | * | 2/2003 |
| JP | 2004200602 A | * | 7/2004 |

(Continued)

*Primary Examiner* — Timothy J. Dole
*Assistant Examiner* — Daniel M Dubuisson
(74) *Attorney, Agent, or Firm* — MORGAN, LEWIS & BOCKIUS LLP

(57) ABSTRACT

A method of manufacturing a multilayer electronic component includes forming a ceramic laminate in which a plurality of ceramic green sheets and a plurality of internal electrode patterns are stacked in a first direction; cutting the ceramic laminate into individual multilayer chips, by irradiating a laser onto one surface of the ceramic laminate and irradiating a laser onto the other surface opposing the one surface of the ceramic laminate in the first direction; firing one of the multilayer chips so as to form a ceramic body including an internal electrode and a dielectric layer; and forming external electrodes on a first side and a second side of the ceramic body.

25 Claims, 21 Drawing Sheets

(56) References Cited

U.S. PATENT DOCUMENTS

| | | | |
|---|---|---|---|
| 2016/0233027 A1* | 8/2016 | Iijima | H01G 4/232 |
| 2016/0268047 A1* | 9/2016 | Shin | H01G 4/232 |
| 2017/0301471 A1* | 10/2017 | Ono | H01G 4/224 |
| 2018/0301283 A1* | 10/2018 | Tomizawa | H01G 4/005 |
| 2020/0075259 A1* | 3/2020 | Park | H01G 4/30 |
| 2021/0225594 A1* | 7/2021 | Hashimoto | H01G 4/248 |
| 2022/0293342 A1* | 9/2022 | Hirao | H01G 4/005 |

FOREIGN PATENT DOCUMENTS

| | | | |
|---|---|---|---|
| JP | 2005-123288 A | | 5/2005 |
| JP | 2016012640 A | * | 1/2016 |
| JP | 2017152623 A | * | 8/2017 |
| JP | 2019186295 A | * | 10/2019 |
| KR | 10-2008-0093321 A | | 10/2008 |
| KR | 20200009978 A | * | 1/2020 |

\* cited by examiner

MULTILAYER ELECTRONIC COMPONENT WITH CURVED SIDE SURFACES

CROSS-REFERENCE TO RELATED APPLICATION(S)

This application claims benefit of priority to Korean Patent Application No. 10-2021-0189812 filed on Dec. 28, 2021 and Korean Patent Application No. 10-2022-0095543 filed on Aug. 1, 2022 in the Korean Intellectual Property Office, the disclosures of which are incorporated herein by reference in their entirety.

TECHNICAL FIELD

The present disclosure relates to a method of manufacturing a multilayer electronic component and to a multilayer electronic component.

BACKGROUND

Multi-layered Ceramic Capacitors (MLCCs), the multilayer electronic components, are chip-type capacitors installed on the printed circuit board of various electronic products such as imaging devices such as liquid crystal displays (LCDs) and plasma display panels (PDPs), computers, and smartphones and mobile phones, to charge or discharge electricity.

Such a multilayer ceramic capacitor may be used as a component of various electronic devices due to a small size, high capacity, and ease of mounting thereof. As various electronic devices such as computers and mobile devices are miniaturized and have high output, demand for miniaturized and high capacity multilayer ceramic capacitors is increasing.

In general, a multilayer ceramic capacitor may be formed by alternately laminating a ceramic green sheet and a plurality of internal electrode patterns to form a ceramic laminate, and then cutting the ceramic laminate to a required product size.

Currently, as a method of cutting a ceramic laminate, a method using a stage and a blade is widely used. The method of using the blade is performed by fixing the ceramic laminate to a vacuum stage and moving the blade in a vertical direction of the stage.

However, in the case of the related art method using a blade, various problems exist. First, when the ceramic green sheets are laminated and compressed to form a ceramic laminate, deformation of the ceramic laminate may occur, and in the case of the method using a blade, such deformation of the ceramic laminate cannot be considered.

In addition, since the ceramic laminate and the blade are in direct contact during cutting, cracks may occur in the cut multilayer chip due to shear stress applied to the ceramic laminate, and as the blade wears out due to the repeated cutting process, damage to the cut surface of the ceramic laminate may occur.

Finally, the individual multilayer chips separated after cutting come into contact with each other. Accordingly, a chip sticking defect in which the multilayer chips stick to each other may occur due to a binder inside the multilayer chip or foreign substances during cutting.

To prevent this problem, a method of irradiating a laser on the upper portion of the ceramic laminate may be considered, but in the method using a laser, the processing speed decreases as the processing depth of the laser increases, and thus, there is a problem in which the processing efficiency is low. Further, as the laser moves away from the focal point, the processing line width increases, and thus, the ceramic laminate is cut diagonally, such that the cross section of the individual multilayer chips has a trapezoidal shape. In this case, when the cross-section of the multilayer chip has a trapezoidal shape, external electrodes may not be uniformly formed, and thus reliability of the multilayer ceramic capacitor may deteriorate.

SUMMARY

An aspect of the present disclosure is to prevent cutting defects due to deformation of a ceramic laminate.

An aspect of the present disclosure is to prevent cracks from occurring due to shear stress occurring during cutting.

An aspect of the present disclosure is to prevent chip sticking defects.

An aspect of the present disclosure is to shorten the processing time by irradiating a laser on one surface and the other surface of a ceramic laminate, respectively.

An aspect of the present disclosure is to improve the reliability of a multilayer electronic component by improving the shape of a ceramic body.

According to an aspect of the present disclosure, a method of manufacturing a multilayer electronic component includes forming a ceramic laminate in which a plurality of ceramic green sheets and a plurality of internal electrode patterns are stacked in a first direction, cutting the ceramic laminate into individual multilayer chips, by irradiating a laser onto one surface of the ceramic laminate and irradiating a laser onto the other surface opposing the one surface of the ceramic laminate in the first direction, firing the multilayer chips so as to form a ceramic body including an internal electrode and a dielectric layer, and forming external electrodes on a first side and a second side of the ceramic body.

According to an aspect of the present disclosure, a multilayer electronic component includes a ceramic body including a dielectric layer and a plurality of first and second internal electrodes stacked in a first direction with the dielectric layer interposed therebetween, and first and second external electrodes connected to the first and second internal electrodes, respectively. The first and second internal electrodes extend to a first side and a second side of the ceramic body, respectively. The ceramic body includes a plurality of curved surfaces disposed on the first side and a plurality of curved surfaces disposed on the second side, at least a portion of regions connected to each other in the plurality of curved surfaces on the first side being a discontinuous region, and at least a portion of regions connected to each other in the plurality of curved surfaces on the second side being a discontinuous region.

According to an aspect of the present disclosure, a multilayer electronic component includes a ceramic body including a dielectric layer and a plurality of first and second internal electrodes stacked in a first direction with the dielectric layer interposed therebetween, and first and second external electrodes connected to the first and second internal electrodes, respectively. The first and second internal electrodes extend to the first and second sides of the ceramic body, respectively. The ceramic body includes a plurality of inclined surfaces disposed on the first side and inclined with respect to the first direction, and a plurality of inclined surfaces disposed on the second side and inclined with respect to the first direction. A first connection region in which the plurality of inclined surfaces of the first side of the ceramic body are connected and a second connection region in which the plurality of inclined surfaces of the second side of ceramic body are connected are located on different levels with respect to the first direction.

According to an aspect of the present disclosure, a multilayer electronic component includes a ceramic body including a dielectric layer and a plurality of first and second internal electrodes stacked in a first direction with the dielectric layer interposed therebetween, and first and second external electrodes connected to the first and second internal electrodes, respectively. The first and second internal electrodes extend to a first side and a second side of ceramic body, respectively. The ceramic body includes a plurality of inclined surfaces disposed on the first side and inclined with respect to the first direction, and a plurality of inclined surfaces disposed on the second side and inclined with respect to the first direction. On the first side of the ceramic body, a first connection region that is a discontinuous region in which the plurality of inclined surfaces on the first side are connected is disposed, and on the second side of the ceramic body, a second connection region that is a discontinuous region in which the plurality of inclined surfaces on the second side are connected is disposed. At least one of the first and second connection regions is disposed in a position offset in the first direction from a center of the ceramic body in the first direction.

According to an aspect of the present disclosure, a method of manufacturing a multilayer electronic component includes forming a ceramic laminate in which a plurality of ceramic green sheets and a plurality of internal electrode patterns are stacked, acquiring an image of a surface of the ceramic laminate, differentiating a difference in brightness in the image to identify a first region of the surface of the ceramic laminate and a second region of the surface of the ceramic laminate connected to the first region, setting a cutting area in the surface of the ceramic laminate based on a boundary between the first region and the second region, cutting the ceramic laminate into individual multilayer chips, by irradiating a laser at least onto the cutting area in the surface of the ceramic laminate, firing one of the multilayer chips so as to form a ceramic body including an internal electrode and a dielectric layer, and forming external electrodes on a first side and a second side of the ceramic body.

According to an aspect of the present disclosure, a multilayer electronic component includes a ceramic body including a dielectric layer and a plurality of first and second internal electrodes stacked in a first direction with the dielectric layer interposed therebetween, and first and second external electrodes disposed on a first side and a second side of the ceramic body opposing each other in a second direction, and connected to the first and second internal electrodes, respectively. The body includes a third side and a fourth side opposing each other in a third direction. The first internal electrode is connected to the first side, the third side and the fourth side of the ceramic body, and the second internal electrode is connected to the second side, the third side and the fourth side of the ceramic body. The plurality of first and second internal electrodes includes one internal electrode and another internal electrode, the one internal electrode has a length in the third direction shorter than a length of the another internal electrode in the third direction, and the another internal electrode is closer to a center portion of the ceramic body than the one internal electrode in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
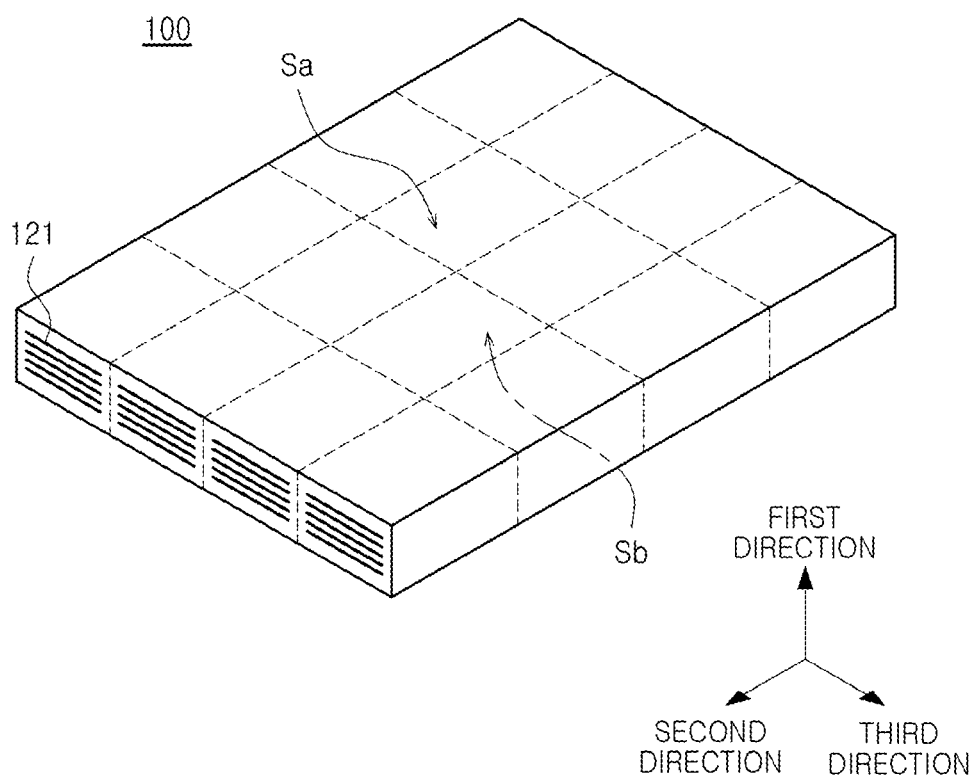
FIG. 1 is a perspective view schematically illustrating a ceramic laminate manufactured according to an embodiment.

Hereinafter, embodiments of the present disclosure will be described with reference to specific embodiments and the accompanying drawings. However, the embodiment of the present disclosure may be modified in various other forms, and the scope of the present disclosure is not limited to the embodiments described below. Further, the embodiments of the present disclosure are provided to more completely describe the present disclosure to those skilled in the art. Accordingly, the shape and size of elements in the drawings may be exaggerated for a clearer description, and elements indicated by the same reference numerals in the drawings are the same elements.

In addition, to clearly describe the present disclosure in the drawings, parts irrelevant to the description are omitted, and since the size and thickness of each component illustrated in the drawings are arbitrarily indicated for convenience of description, and the present disclosure is not necessarily limited to the illustration. In addition, components having the same function within the scope of the same concept will be described using the same reference numerals. Furthermore, throughout the specification, when a part "includes" a certain component, it means that other components may be further included, rather than excluding other components, unless otherwise stated.

In the drawings, a first direction may be defined as a stacking direction or a thickness direction, a second direction may be defined as a longitudinal direction, and a third direction may be defined as a width direction.

FIG. 1 is a perspective view schematically illustrating a ceramic laminate manufactured according to an embodiment.

Figure 2:
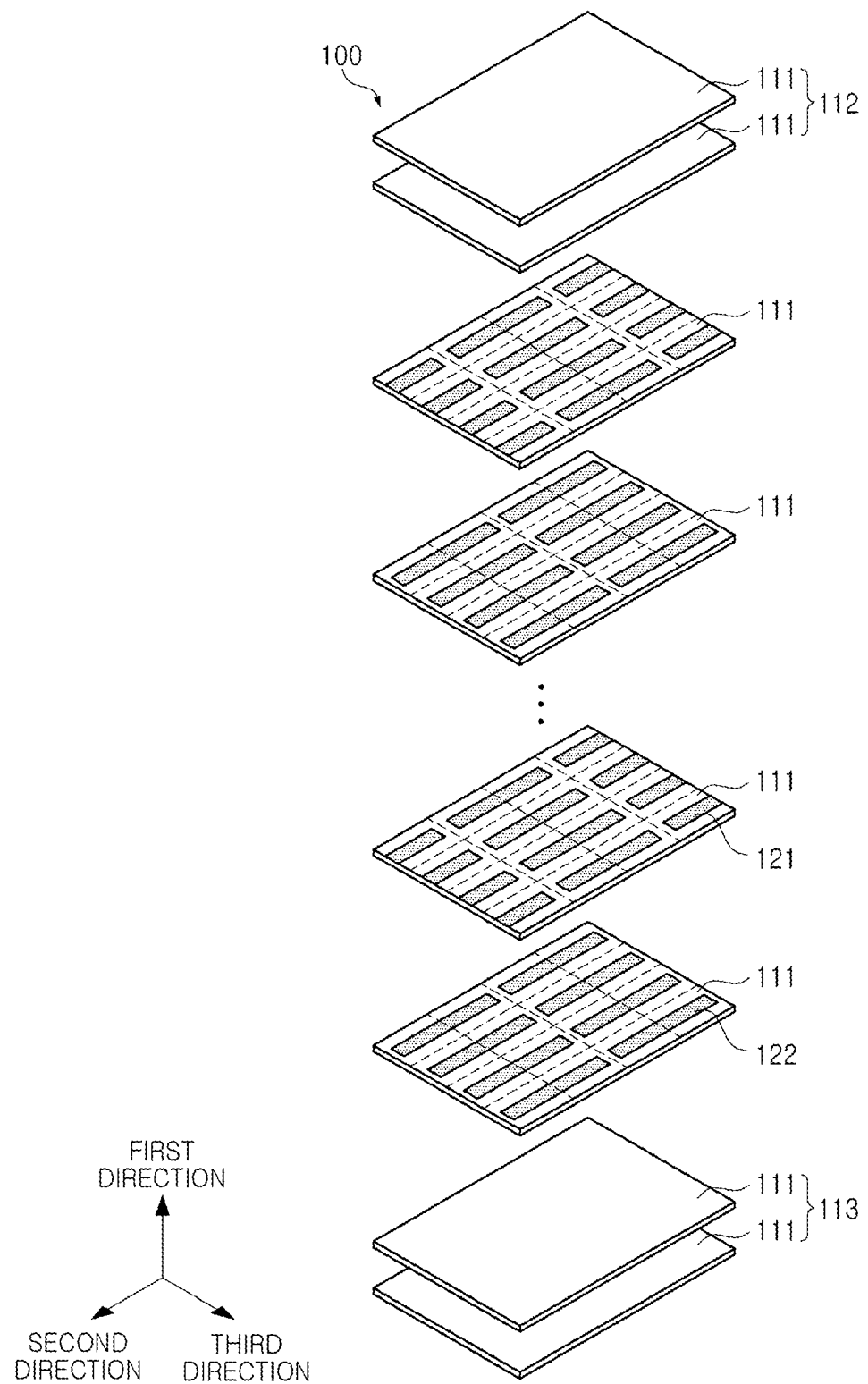
FIG. 2 is an exploded perspective view of a ceramic laminate.

FIG. 2 is an exploded perspective view of a ceramic laminate.

Figure 3:
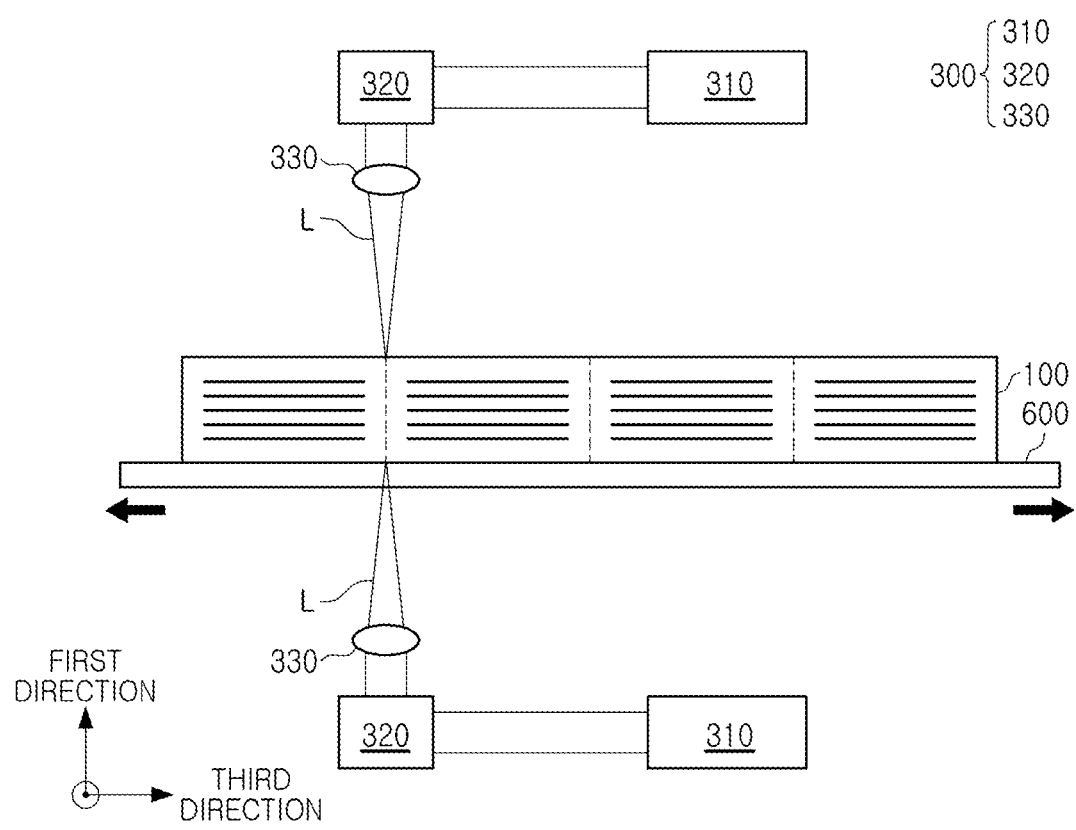
FIGS. 3 and 4 schematically illustrate a method of manufacturing a multilayer electronic component according to an embodiment.
Figure 4:
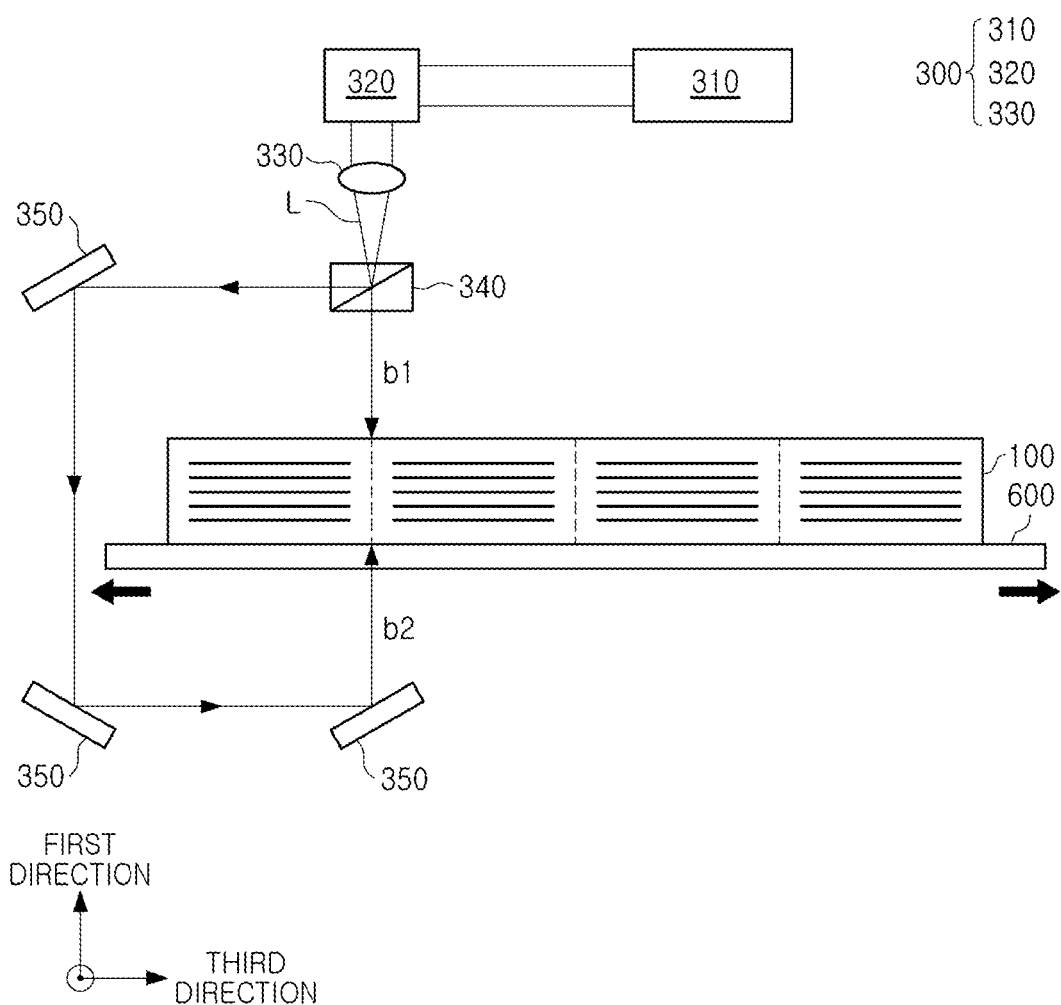

FIGS. 3 and 4 schematically illustrate a method of manufacturing a multilayer electronic component according to an embodiment.

Figure 6:
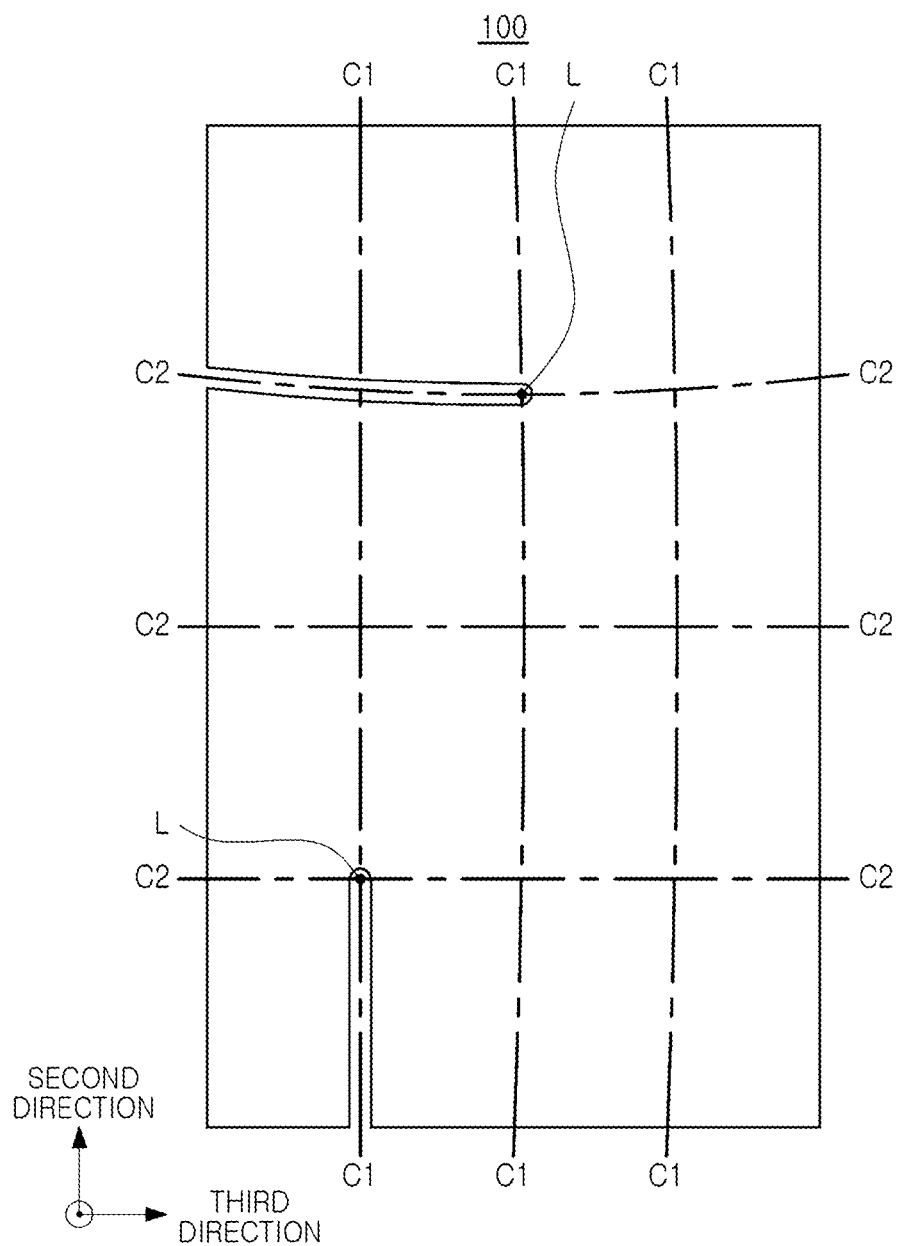
FIG. 6 schematically illustrates a top plan view and a cut line of a ceramic laminate.

FIG. 6 schematically illustrates a top plan view and a cut line of a ceramic laminate.

Figure 7:
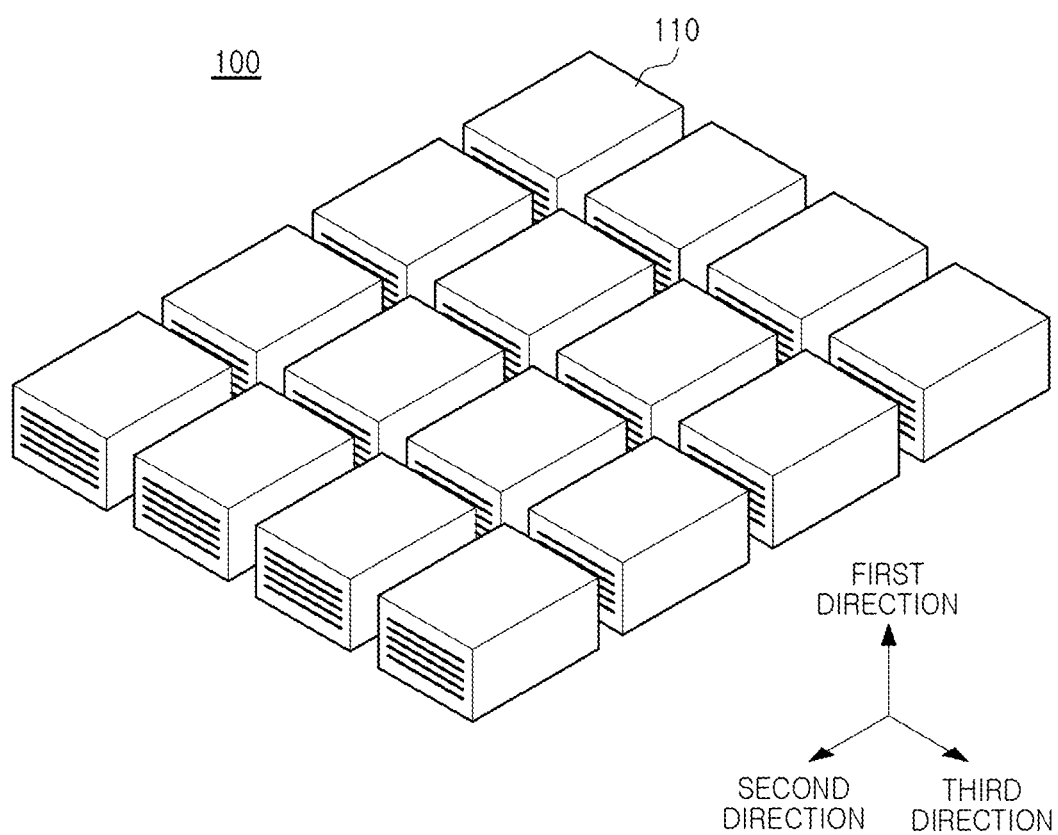
FIG. 7 is a perspective view schematically illustrating cut individual multilayer chips.

FIG. 7 is a perspective view schematically illustrating cut individual multilayer chips.

A method of manufacturing a multilayer electronic component according to an embodiment includes forming a ceramic laminate 100 in which a plurality of ceramic green sheets 111 and a plurality of internal electrode patterns 121 and 122 are stacked in a first direction, and cutting the ceramic laminate 100 in units of individual multilayer chips 110 by irradiating lasers onto one surface and the other surface of the ceramic laminate 100 opposing each other in the first direction.

As described above, in a case in which the ceramic laminate 100 is cut with a blade, the deformation of the ceramic laminate due to compression cannot be considered, and since the blade is in direct contact with the ceramic laminate when cutting, cracks and chip adhesion defects may occur due to shear stress.

In addition, in a case in which cutting is performed by irradiating a laser only on the upper portion of the ceramic laminate 100, there is a problem of relatively low process efficiency, and since the cross-section of the cut individual multilayer chips has a trapezoidal shape, the external electrodes are non-uniformly formed, thereby lowering reliability of the multilayer electronic component.

On the other hand, in the method of manufacturing a multilayer electronic component according to an embodiment, by cutting the ceramic laminate 100 by irradiating a laser, deformation of the ceramic laminate 100 may be considered, and since the ceramic laminate 100 is cut through a non-contact unit, cracks and chip adhesion defects may be prevented. In addition, by irradiating the laser on one surface and the other surface of the ceramic laminate 100 opposing each other in the first direction, respectively, and cutting the ceramic laminate, productivity may be improved, and processing time may be shortened. In addition, reliability may be further improved by controlling the shape of the cross-section of the multilayer electronic component.

Hereinafter, respective operations included in the method of manufacturing a multilayer electronic component according to an embodiment will be described in more detail.

Method of Manufacturing Multilayer Electronic Component

First, referring to FIGS. 1 and 2, an operation of forming the ceramic laminate 100 may be performed by laminating and compressing a plurality of ceramic green sheets 111 and a plurality of internal electrode patterns 121 and 122 in a first direction. In detail, forming the ceramic laminate 100 may include alternately laminating a plurality of first internal electrode patterns 121 and a plurality of second internal electrode patterns 122 with a ceramic green sheet 111 interposed therebetween, but the present disclosure is not limited thereto. For example, forming the ceramic laminate 100 may include alternately laminating the first ceramic green sheet on which the plurality of first internal electrode patterns 121 are formed and the second ceramic green sheet on which the plurality of second internal electrode patterns 122 are formed.

The ceramic laminate 100 may include cover regions 112 and 113 disposed on the plurality of internal electrode patterns 121 and 122 disposed on the outermost side with respect to the first direction. For example, the ceramic laminate 100 may include the first cover region 112 disposed on the plurality of uppermost internal electrode patterns 121 and 122, and the second cover region 113 disposed on the plurality of lowermost internal electrode patterns 121 and 122, in the first direction. The cover regions 112 and 113 may be formed, for example, by laminating one or two ceramic green sheets 111, but the present disclosure is not limited thereto.

The average thickness of the cover regions 112 and 113 does not need to be particularly limited. However, the average thickness of the cover regions 112 and 113 may be 40 μm or less to reduce the size of the multilayer electronic component and obtain an image 500 to be described later with reference to FIGS. 8 and 9. The lower limit of the average thickness of the cover regions 112 and 113 is not particularly limited, but may be, for example, 2 μm or more.

In this case, the average thickness of the cover regions 112 and 113 may indicate the average length of the cover regions 112 and 113 in the first direction, and may be a value obtained by averaging lengths in the first direction measured at five equally spaced points in a cross section of the ceramic laminate 100 having a half length in the second direction. In addition, the average thickness of the cover regions 112 and 113 refer to the average thickness of each of the first cover region 112 and the second cover region 113.

The ceramic green sheet 111 may be prepared by mixing ceramic powder, binder, solvent, and the like to prepare a ceramic slurry and manufacturing the ceramic slurry in the form of a sheet having a thickness of several μm by a doctor blade method. The ceramic powder is not particularly limited as long as sufficient capacitance may be obtained therewith. For example, a barium titanate-based powder, a lead composite perovskite-based powder, or a strontium titanate-based powder may be used. The barium titanate-based powder may include a $BaTiO_3$-based ceramic powder.

The internal electrode patterns 121 and 122 may be formed by printing a conductive paste for internal electrodes, including a conductive metal, on the ceramic green sheet 111. The method of printing the conductive paste for the internal electrode is not particularly limited, but may be performed by, for example, a screen printing method or a gravure printing method.

The conductive paste for the internal electrode may include a conductive metal, a common material powder, a dispersant, a solvent, and the like, but the present disclosure is not limited thereto. The conductive metal may include at least one of, for example, nickel (Ni), copper (Cu), palladium (Pd), silver (Ag), gold (Au), platinum (Pt), tin (Sn), tungsten (W), titanium (Ti) and alloys thereof.

Next, the ceramic laminate 100 is irradiated with a laser and cut in units of multilayer chips. Specifically, as illustrated in FIG. 3, when the surfaces of the ceramic laminate 100 opposing each other in the first direction are referred to as one surface and the other surface, an operation of cutting the ceramic laminate 100 in units of individual multilayer chips 110, including irradiating a laser onto the one surface and irradiating a laser L to the other surface, is performed.

In this case, the ceramic laminate 100 is partially cut by irradiating a laser L on one surface of the ceramic laminate 100, and the ceramic laminate 100 may be completely cut by irradiating the laser L to the other surface of the ceramic laminate 100.

The laser L may be irradiated from a laser device 300. In this case, the laser device 300 may include a laser generating unit 310 that generates the laser L, a scanner 320 that receives the laser L generated by the laser generating unit 310, and a focusing lens 330 for focusing the laser L.

The scanner 320 may include, for example, a Galvano Scanner and/or an Acoustic Optical Modulator (AOD), and may serve to irradiate a laser to the ceramic laminate 100. The focusing lens 330 may be, for example, an F-theta lens, but the present disclosure is not limited thereto.

In the case of the method of manufacturing a multilayer electronic component according to an embodiment of the present disclosure, since the ceramic laminate 100 is cut by the laser L, which is a non-contact unit, cracks may be prevented from occurring in the multilayer chip 110, and chip sticking defects and the like may be prevented by burning and removing the material in the area in which the laser is irradiated. In addition, by irradiating the laser on one surface Sa and the other surface Sb of the ceramic laminate 100, respectively, productivity may be improved and the processing time may be shortened.

In addition, by setting a cutting path in consideration of the deformation of the ceramic laminate 100, occurring in the process of laminating and pressing the plurality of internal electrode patterns 121 and 122 and the ceramic green sheets 111, occurrence of cutting defects may be prevented.

For example, the operation of cutting the ceramic laminate 100 may include moving the laser L irradiated to the one surface Sa and the other surface Sb of the ceramic laminate 100 along a curved path. In addition, the operation of cutting the ceramic laminate 100 may include moving the laser L irradiated to the one surface Sa and the other surface Sb of the ceramic laminate 100 along an irregular path. Accordingly, as illustrated in FIG. 6, the C1-C1 cut line and the C2-C2 cut line may be irregular curves.

By moving the laser L along a curved or irregular path, the thickness (length in the third direction) deviation between first and second margin portions of a ceramic body 210 to be described later may be constantly controlled, and a deviation between a separation distance r1 from one end of a second internal electrode 222 to a first side 1 of the ceramic body 210 and a separation distance r2 from one end of a first internal electrode 221 to a second side 2 of the ceramic body 210, to be described later with reference to FIG. 15, may be constantly controlled.

A method of irradiating the laser L on the first surface Sa and the other surface Sb of the ceramic laminate 100 opposing each other in the first direction is not particularly limited. For example, as illustrated in FIG. 3, as the operation of irradiating the laser includes an operation of irradiating the laser respectively provided from at least two laser devices 300 to one surface Sa and the other surface Sb of the ceramic laminate 100, respectively; at least a portion of the operation of irradiating a laser onto one surface Sa of the ceramic laminate 100, and at least a portion of the operation of irradiating the laser to the other surface Sb of the ceramic laminate 100 may be executed simultaneously.

However, as in the modified example of FIG. 4, as the operation of irradiating the laser includes splitting the laser into a first light b1 and a second light b2 with a beam splitter 340, and irradiating the first light b1 and the second light b2 to the one surface Sa and the other surface Sb of the ceramic laminate 100, respectively, at least a portion of the operation of irradiating a laser onto one surface Sa of the ceramic laminate 100 and at least a portion of the operation of irradiating the laser to the other surface Sb of the ceramic laminate 100 may be simultaneously performed. The beam splitter 340 may pass the first light b1 therethrough and reflect the second light b2. At this time, the passing first light b1 may be irradiated to one surface Sa of the ceramic laminate 100, and the reflected second light b2 may be irradiated to the other surface Sb of the ceramic laminate 100 by a plurality of reflection mirrors 350.

However, the present disclosure is not limited thereto, and the operation of cutting the ceramic laminate 100 may include sequentially executing the operations of irradiating a laser onto one surface Sa of the ceramic laminate 100 and irradiating the laser to the other surface Sb of the ceramic laminate 100.

Figure 5A:
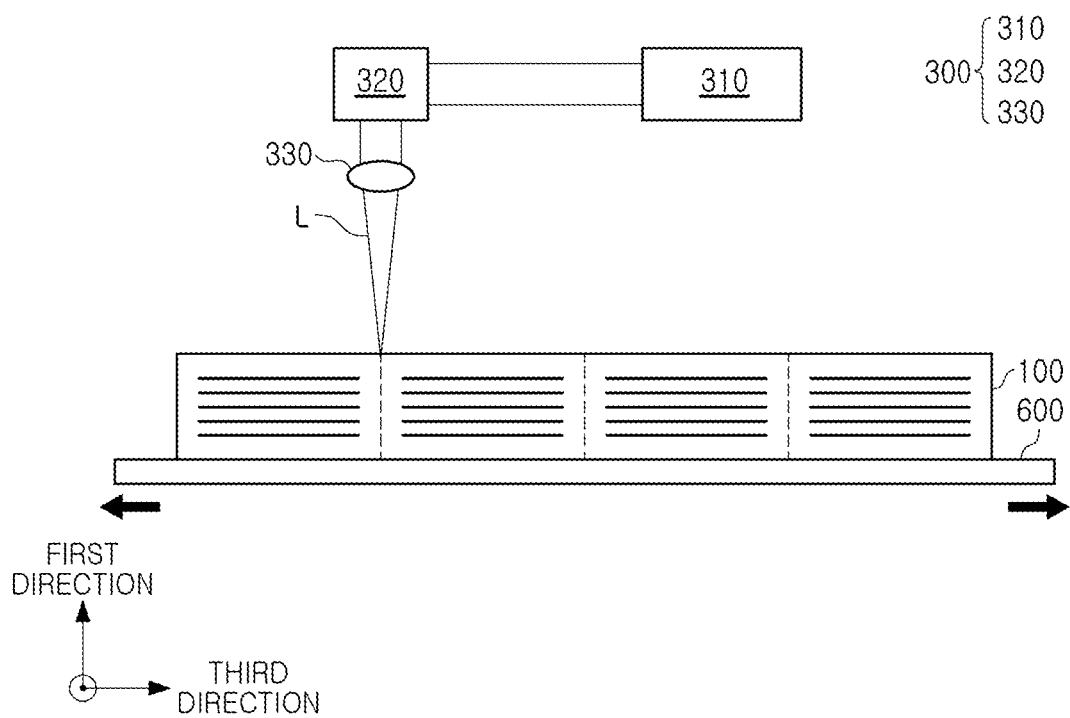
FIGS. 5A and 5B schematically illustrate a method of manufacturing a multilayer electronic component according to an embodiment.
Figure 5B:
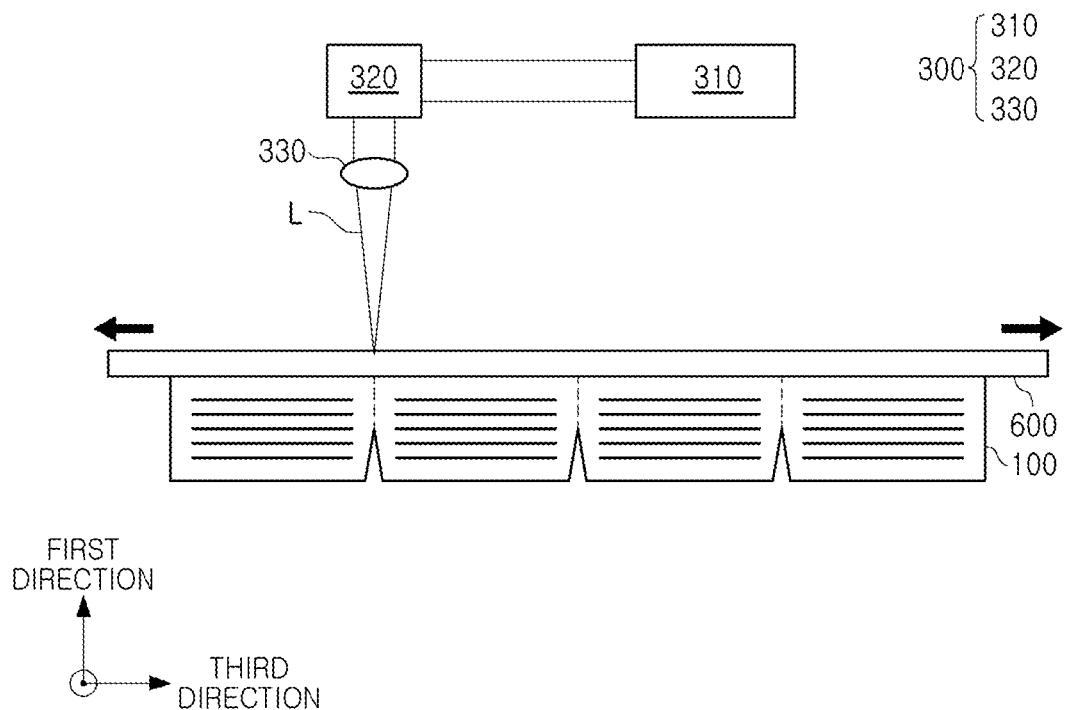

FIGS. 5A and 5B schematically illustrate a method of manufacturing a multilayer electronic component according to an embodiment. Referring to FIGS. 5A and 5B, between the operation of irradiating a laser onto one surface Sa of the ceramic laminate 100 and the operation of irradiating the laser to the other surface Sb of the ceramic laminate 100, by further including an operation of inverting the ceramic laminate 100 vertically based on the first direction, the laser L may be sequentially irradiated to the one surface Sa and the other surface Sb of the ceramic laminate 100 opposing in the first direction without the process of disposing a separate laser device 300 or moving the laser device 300. However, the present disclosure is not limited thereto, and for example, after irradiating a laser onto one surface Sa of the ceramic laminate 100 through the laser device 300, a laser may be irradiated to the other surface Sb of the ceramic laminate 100 through a separate laser device 300.

The ceramic laminate 100 is disposed on a stage 600, and then, may be cut by the laser. To process the ceramic laminate 100 with a relatively large area, the stage 600 may be moved in the second direction and the third direction, and the irradiation point of the laser may be moved by the scanner 320.

The stage 600 may be a transparent substrate that transmits the laser to irradiate the laser on one surface Sa and the other surface Sb of the ceramic laminate 100, respectively, and for example, may be an inorganic substrate such as a glass substrate, a quartz substrate, or a silicon substrate, or a film substrate formed of a transparent resin, but the present disclosure is not limited thereto.

In one embodiment, the power density of the laser may be $1 \times 10^7$ W/cm$^2$ to $1 \times 10^{14}$ W/cm$^2$. If the laser power density is less than $1 \times 10^7$ W/cm$^2$, the processing time may increase and process efficiency may decrease. In addition, when the power density of the laser exceeds $1 \times 10^{14}$ W/cm$^2$, a defect in which the separated individual multilayer chips 110 are destroyed may occur.

In an embodiment, the diameter of the laser focused by the focusing lens may be 1 μm to 20 μm. The diameter of the laser may indicate a diameter of a laser focused on the surface of the ceramic laminate 100. If the diameter of the laser is less than 1 μm, the price of the focusing lens 330 may increase, and the change in the processing line width may become severe and process stability may be deteriorated. If the diameter of the laser is greater than 20 μm, the internal electrode patterns 121 and 122 may be exposed when cutting is performed.

Figure 8:
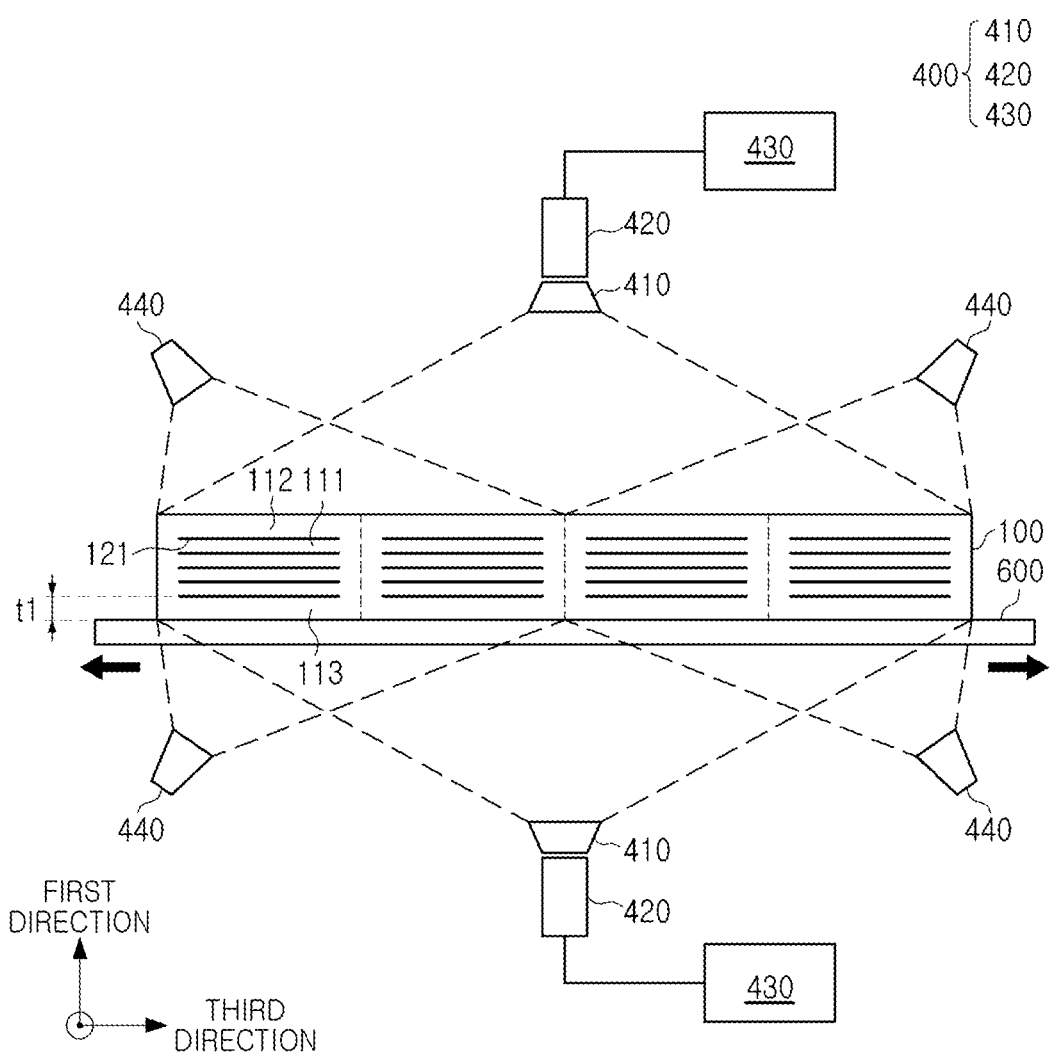
FIG. 8 schematically illustrates a method of manufacturing a multilayer electronic component according to an embodiment.
Figure 9:
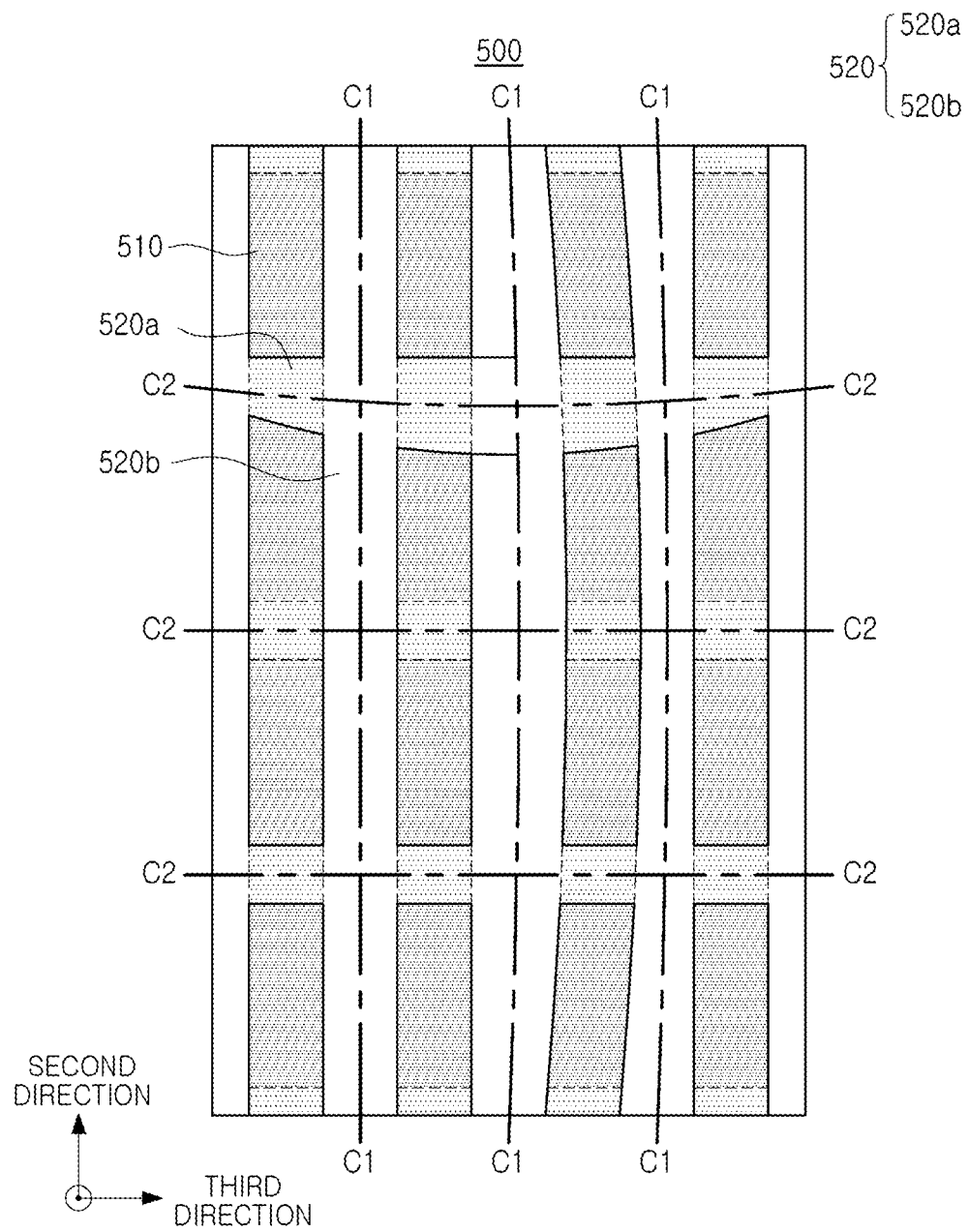
FIG. 9 schematically illustrates an image of one surface of a ceramic laminate manufactured according to an embodiment.

FIG. 8 schematically illustrates a method of manufacturing a multilayer electronic component according to an embodiment. FIG. 9 schematically illustrates an image of one surface of a ceramic laminate manufactured according to an embodiment. Meanwhile, in FIG. 9, only the image of one surface Sa of the ceramic laminate 100 is illustrated, but as will be described later, the image of the other surface Sb of the ceramic laminate 100 may also be obtained by the same method.

Referring to FIGS. 8 and 9, a method of manufacturing a multilayer electronic component according to an embodiment may include acquiring an image 500 of the one surface Sa and the other surface Sb of the ceramic laminate 100 before irradiating the laser, setting a cutting area through the image 500, and irradiating the laser to the cutting area.

The image 500 of the one surface Sa and the other surface Sb of the ceramic laminate 100 may be obtained by, for example, the image sensor 400, and the image sensor 400 may include a lens 410, a CCD 420, and an image processing unit 430. In this case, the CCD 420 refers to a Charged Coupled Device (CCD), and may refer to a sensor that converts light into an electrical signal to obtain an image.

In more detail, the operation of acquiring the image 500 of the one surface Sa and the other surface Sb of the ceramic laminate 100 may include the operation of incident light on the one surface Sa and the other surface Sb of the ceramic laminate 100. The light may be irradiated from lighting units 440 respectively disposed above and below the ceramic laminate 100. Light irradiated to one surface Sa and the other surface Sb of the ceramic laminate 100 may be reflected, and a region in which the internal electrode patterns 121 and 122 are disposed and a region in which the internal electrode patterns 121 and 122 are not disposed may have different reflectances of light.

In the ceramic laminate 100, the wavelength of the light may be set within a range in which a difference in reflectance between a region in which the internal electrode patterns 121 and 122 are disposed and a region in which the internal electrode patterns 121 and 122 are not disposed, based on the first direction, is relatively great. For example, the wavelength of the visible light region may be set within the range of 400 nm to 600 nm. However, the present disclosure is not limited thereto, and the wavelength of the light may be set within an appropriate range according to the composition of the internal electrode patterns 121 and 122 and the ceramic green sheet 111.

Since the conductive metal included in the internal electrode patterns 121 and 122 has a high absorption rate of light having a wavelength in the visible light region, in the ceramic laminate 100, the reflectance of light irradiated to one surface Sa and the other surface Sb of the ceramic laminate 100 may be higher in the region in which the internal electrode patterns 121 and 122 are not disposed, than in the region in which the internal electrode patterns 121 and 122 are disposed. In detail, in the ceramic laminate 100 in which an average thickness t1 of the cover regions 112 and 113 is 40 μm or less, the difference in reflectance between the region in which the internal electrode patterns 121 and 122 are not disposed and the region in which the internal electrode patterns 121 and 122 are disposed is relatively high, and may thus be more clearly distinguished on the image 500.

Light reflected from one surface Sa and the other surface Sb of the ceramic laminate 100 may be focused by the lens 410 of the image sensor 400, and the focused light may be input to the CCD 420 disposed on the lens 410. The input light may be converted into an electrical signal by the CCD 420, and the image processing unit 430 receives the electrical signal received from the CCD 420, and converts the received electrical signal into an image, thereby obtaining images of one surface Sa and the other surface Sb of the ceramic laminate 100.

In this case, respective regions of the image 500 may have different levels of brightness depending on the amount of light reflected from one surface Sa and the other surface Sb of the ceramic laminate 100, and brightness may be relatively high in areas with high reflectivity, while brightness may be low in a region with low reflectance.

Next, a cutting area may be set through the images 500 of the one surface and the other surfaces Sa and Sb of the ceramic laminate 100. The operation of setting the cutting area through the image 500 may include dividing the image 500 into a first region 510 in which a plurality of first and second internal electrode patterns 121 and 122 overlap in a first direction and a second region 520 in which the plurality of first and second internal electrode patterns 121 and 122 do not overlap in the first direction, and setting at least a portion of the region of the ceramic laminate 100 corresponding to the second region 520 as the cutting area. The first region 510 and the second region 520 may be distinguished by a difference in brightness in the image 500, and the brightness of the first region 510 may be lower than the brightness of the second region 520.

In the first region 510, since the first internal electrode pattern 121 and the second internal electrode pattern 122 overlap in the first direction, the reflectance of light irradiated to one surface and the other surface Sa and Sb of the ceramic laminate 100 may be lower, compared to in the second region 520. For example, in the first region 510, the number of internal electrode patterns 121 and 122 having a high absorption rate of irradiated light is greater than that of the second region 520, and thus, the brightness in the image 500 of the first region 510 may appear lower than that of the second region 520. From the same viewpoint, since the number of internal electrode patterns 121 and 122 in the second region 520 is smaller than that of the first region 510, the brightness in the image 500 of the second region 520 may appear higher than that of the first region 510. In this case, the region of the ceramic laminate 100 corresponding to the second region 520 in the image 500 may be set as the cutting area.

In addition, the operation of setting the cutting area through the image 500 may further include dividing the second region 520 into a 2a region 520a in which only one of the first internal electrode pattern 121 and the second internal electrode pattern 122 is disposed in the first direction, and a 2b region 520a in which the first internal electrode pattern 121 and the second internal electrode pattern 122 are not present in the first direction, and setting the 2a region 520a and the 2b region 520b as the cutting area.

The brightness of the 2a region 520a may be lower than the brightness of the 2b region 520b. For example, the 2b region 520b is a region in which the internal electrode patterns 121 and 122 having a high absorption rate of the irradiated light are not present, and may be a region in which the light irradiated from the lighting unit 440 has highest reflectivity.

In the case of the method of manufacturing a multilayer electronic component according to an embodiment of the present disclosure, through the image 500 of one surface Sa and the other surface Sb of the ceramic laminate 100, the degree of deformation of the ceramic laminate 100 due to compression may be inspected, and in consideration of the degree of deformation, the laser may be irradiated to the cutting area, and the laser may be moved along a curved and/or irregular path.

Figure 10:
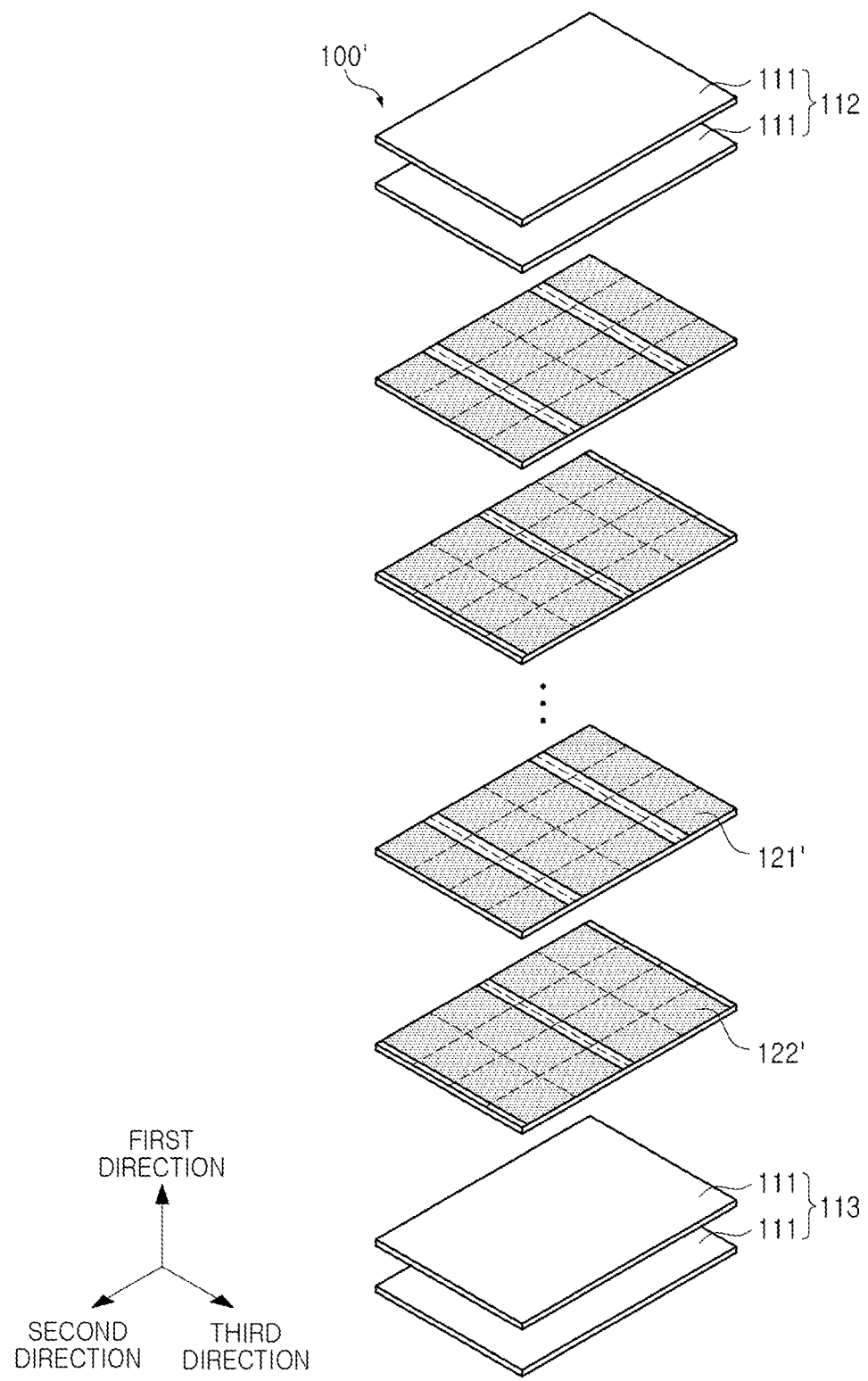
FIG. 10 is a modification of FIG. 2.
Figure 11:
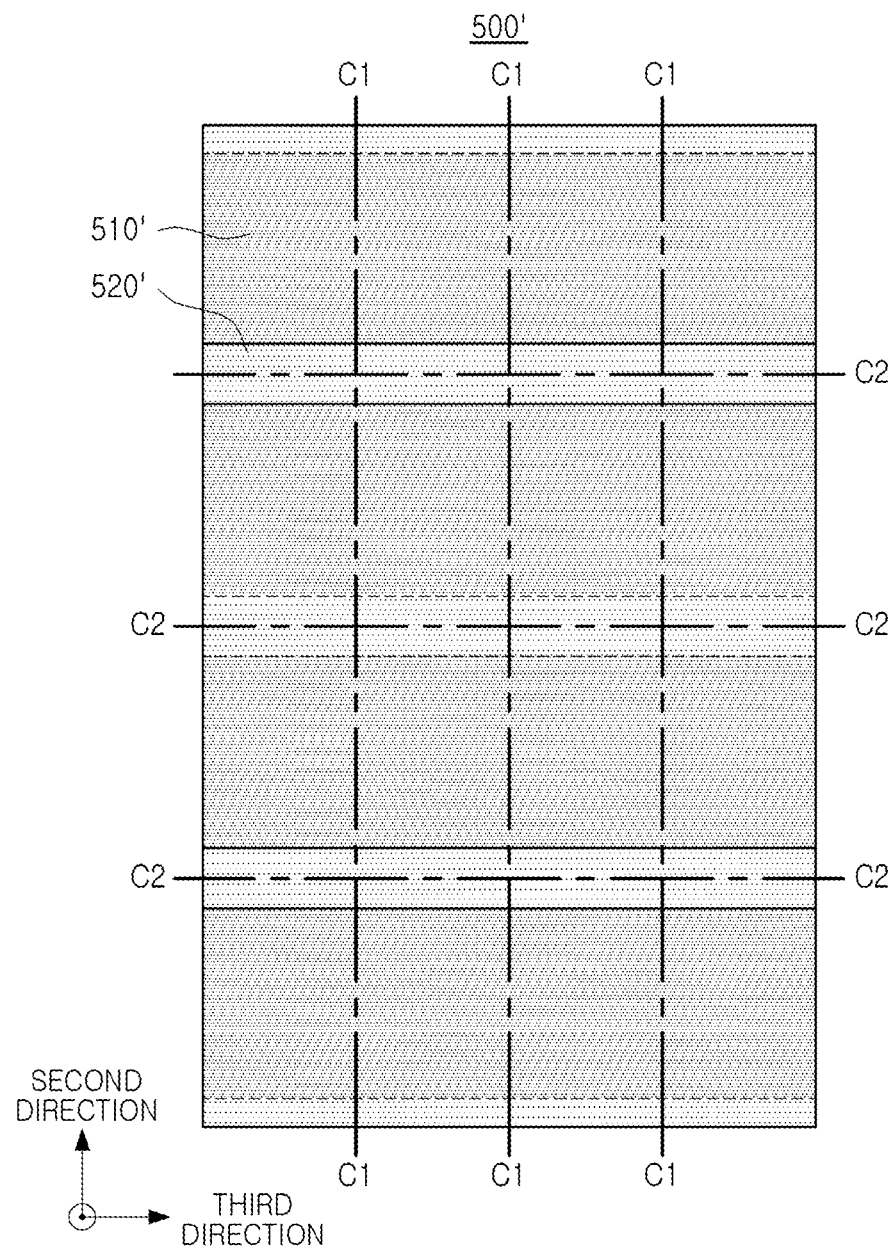
FIG. 11 schematically illustrates an image of one surface of the ceramic laminate of FIG. 10.
Figure 12:
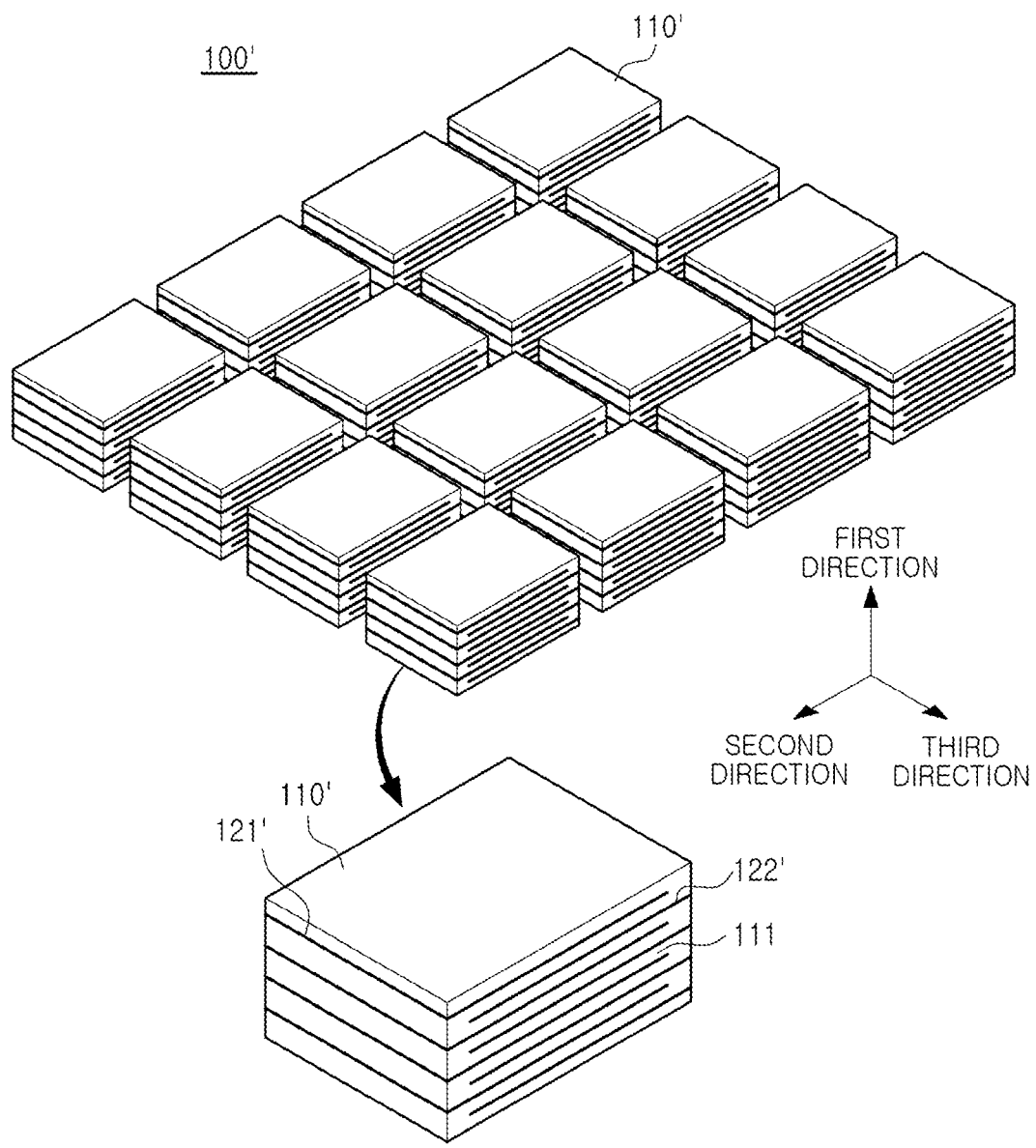
FIG. 12 is a perspective view schematically illustrating cut individual multilayer chips.

FIG. 10 is a modified example of FIG. 2. FIG. 11 schematically illustrates an image 500' of one surface of the ceramic laminate 100' of FIG. 10. FIG. 12 is a perspective view schematically illustrating the cut individual multilayer chips 110'.

Referring to FIGS. 10 to 12, in an embodiment, the plurality of respective internal electrode patterns 121' and 122' may be disposed to be spaced apart from each other in the second direction and may be disposed to extend in the third direction.

For example, the ceramic laminate 100' may include a plurality of first internal electrode patterns 121' disposed on the ceramic green sheet 111 at predetermined intervals, and a plurality of second internal electrode patterns 122' disposed on the ceramic green sheet 111 at predetermined intervals.

In this case, the plurality of first internal electrode patterns 121' may be respectively disposed parallel to each other with respect to the second direction, and the plurality of second internal electrode patterns 122' may be respectively disposed parallel to each other in the second direction. For example, the plurality of first internal electrode patterns 121' and second internal electrode patterns 122' may be arranged in a stripe shape.

In this case, the operation of setting the cutting area through an image 500' may include dividing the image 500' into a first region 510' in which first and second internal electrode patterns 121' and 122' overlap in the first direction, and a second region 520' in which the first and second internal electrode patterns 121' and 122' do not overlap each other, and setting at least a portion of a region of the ceramic laminate 100' corresponding to the second region 520' as the cutting area. The first region 510' and the second region 520' may be distinguished by a difference in brightness in the image 500', and as described above, the brightness of the first region 510' may be lower than the brightness of the second region 520'.

When the internal electrode patterns 121' and 122' are stripe-shaped, by irradiating a laser onto the cutting area of the ceramic laminate 100' corresponding to the second region 520' in the image 500', the ceramic laminate 100' may be cut along the C2-C2 cutting line. In addition, by cutting the ceramic laminate 100 by irradiating a laser along the preset C1-C1 cutting line, a plurality of multilayer chips 110' in a component unit may be formed. However, the present disclosure is not limited thereto, and after cutting the ceramic laminate 100' along the C1-C1 cutting line, a plurality of multilayer chips 110' may be formed by irradiating the laser along the C2-C2 cutting line. In this case, the cut first and second internal electrode patterns 121' and 122' may be exposed on both sides of the multilayer chip 110' opposite to each other in the third direction.

Since the internal electrode patterns 121' and 122' are stripe-shaped, the method of setting the C1-C1 cutting line is not particularly limited, and for example, a plurality of C1-C1 cutting lines at equal intervals in the third direction may be set in consideration of the length of the multilayer chip 110' in the third direction.

Figure 13:
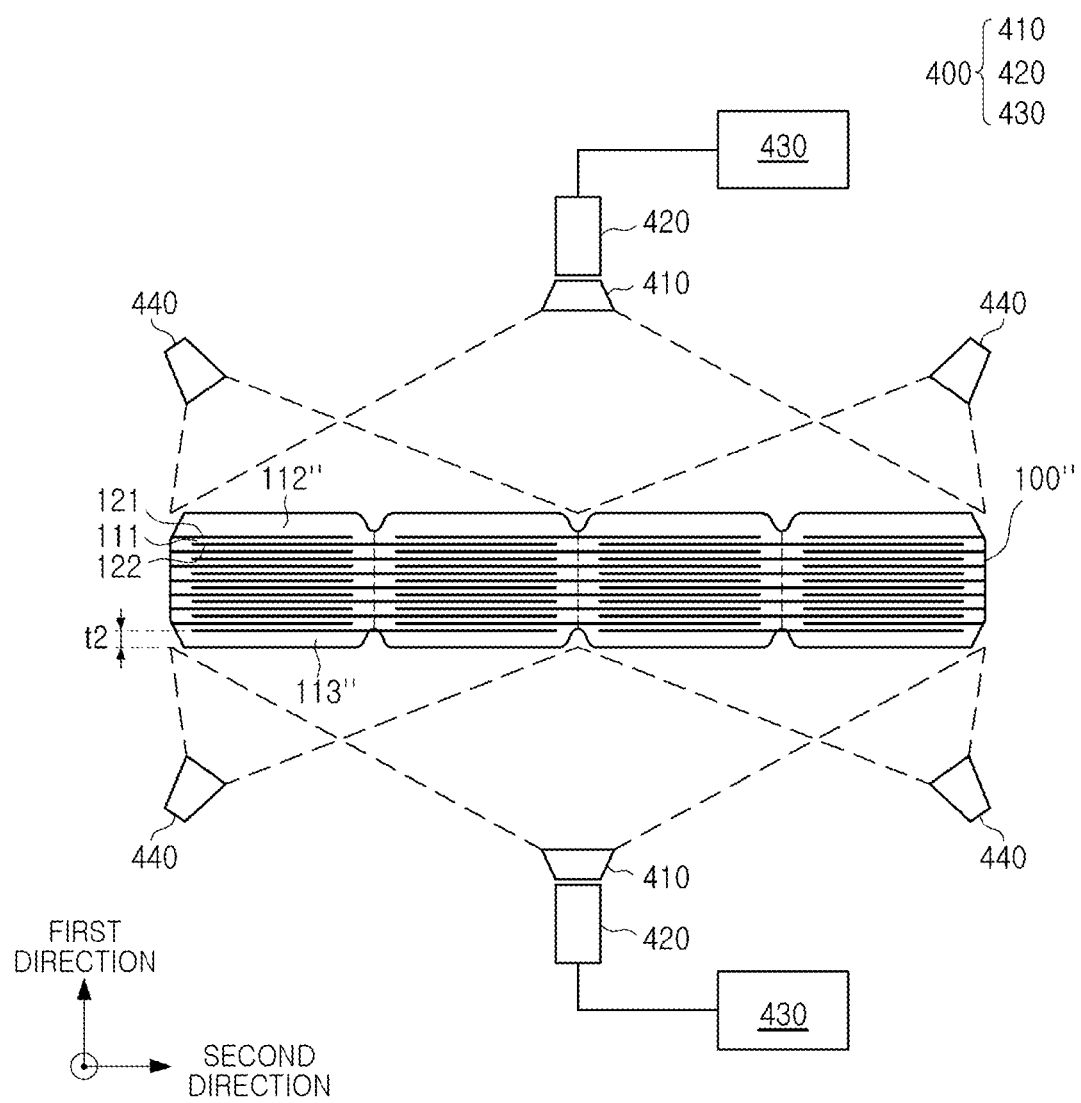
FIG. 13 is a modification of FIG. 8.

FIG. 13 is a modification of FIG. 8. Referring to FIG. 13, in an embodiment, an average thickness t2 of cover regions 112" and 113" may be greater than 40 μm and less than or equal to 300 μm. If the thickness of the cover regions 112" and 113" of the ceramic laminate 100" is more than 40 μm, the difference in reflectance between the region in which the internal electrode patterns 121 and 122 are not disposed and the region in which the internal electrode patterns 121 and 122 are disposed based on the first direction is reduced, and thus, it may be difficult to distinguish on the image 500.

Accordingly, forming the ceramic laminate 100" may include pressing the ceramic laminate 100" to recess at least a partial region of the ceramic laminate 100" in the first direction.

In the case of a large multilayer electronic component having a large number of stacked internal electrode patterns 121 and 122 and ceramic green sheets 111, since a thickness difference occurs between the region in which the internal electrode patterns 121 and 122 are disposed and the region in which the internal electrode patterns 121 and 122 are not disposed based on the first direction, the region in which the internal electrode patterns 121 and 122 are not disposed may be recessed by compressing the ceramic laminate 100". In addition, since the region in which the first and second internal electrode patterns 121 and 122 do not overlap in the first direction is thinner than the region in which the first and second internal electrode patterns 121 and 122 overlap, the region in which the first and second internal electrode patterns 121 and 122 do not overlap may be depressed.

Thereafter, as described above, the operation of acquiring an image of one surface and the other surface of the ceramic laminate 100" may include an operation of irradiating light to one surface and the other surface of the ceramic laminate 100" through the lighting units 440, and the irradiated light may be scattered in the recessed area. In addition, the scattered light may be converted into images of one surface and the other surface of the ceramic laminate 100" by the image sensor 400.

In this case, the image sensor 400 may include a dark field sensor. A clearer image 500 may be obtained by obtaining the image 500 only with the scattered light through the dark field sensor, but the present disclosure is not limited thereto.

As described above, the cutting area may be set through the images 500 of one surface and the other surface of the ceramic laminate 100", and the cutting area may refer to a recessed region of the ceramic laminate 100" formed by compression. For example, the region in which the first and second internal electrode patterns 121 and 122 overlap in the first direction may have a relatively thickest thickness and thus may not be depressed during compression, and in this region, light irradiated by the lighting unit 440 may not be scattered. On the other hand, the region in which the first and second internal electrode patterns 121 and 122 are not present in the first direction has a thinnest thickness and is depressed. The depression depth of the region in which the first and second internal electrode patterns 121 and 122 do not exist in the first direction is deeper than the depth of the region in which only one of the first internal electrode pattern 121 and the second internal electrode pattern 122 is disposed in the first direction. Therefore, respective regions may be distinguished in the image 500 by a difference in a scattering rate.

A method of manufacturing a multilayer electronic component according to an embodiment includes forming the ceramic body 210 including internal electrodes 221 and 222 and a dielectric layer 211 to be described later, by firing the multilayer chip 110. The internal electrodes 221 and 222 may be formed by firing the internal electrode patterns 121 and 122, and the dielectric layer 211 may be formed by firing the ceramic green sheet 111.

In addition, the method of manufacturing a multilayer electronic component according to an embodiment includes forming external electrodes 231 and 232 on the first side 1 and the second side 2 of the ceramic body 210.

The method of manufacturing a multilayer electronic component according to an embodiment may further include polishing the surface of the ceramic body 210. The polishing may be performed after firing the multilayer chip 110 and before forming the external electrodes 231 and 232.

By polishing the surface of the ceramic body 210 through the polishing operation, chipping defects in which the plurality of ceramic bodies 210 collide with each other and break during the manufacturing process may be prevented. A method of polishing the surface of the ceramic body 210 is not particularly limited, but may be performed by, for example, dry polishing and/or wet polishing.

Hereinafter, respective configurations of the multilayer electronic component according to an embodiment will be described in more detail.

Multilayer Electronic Component

Figure 14:
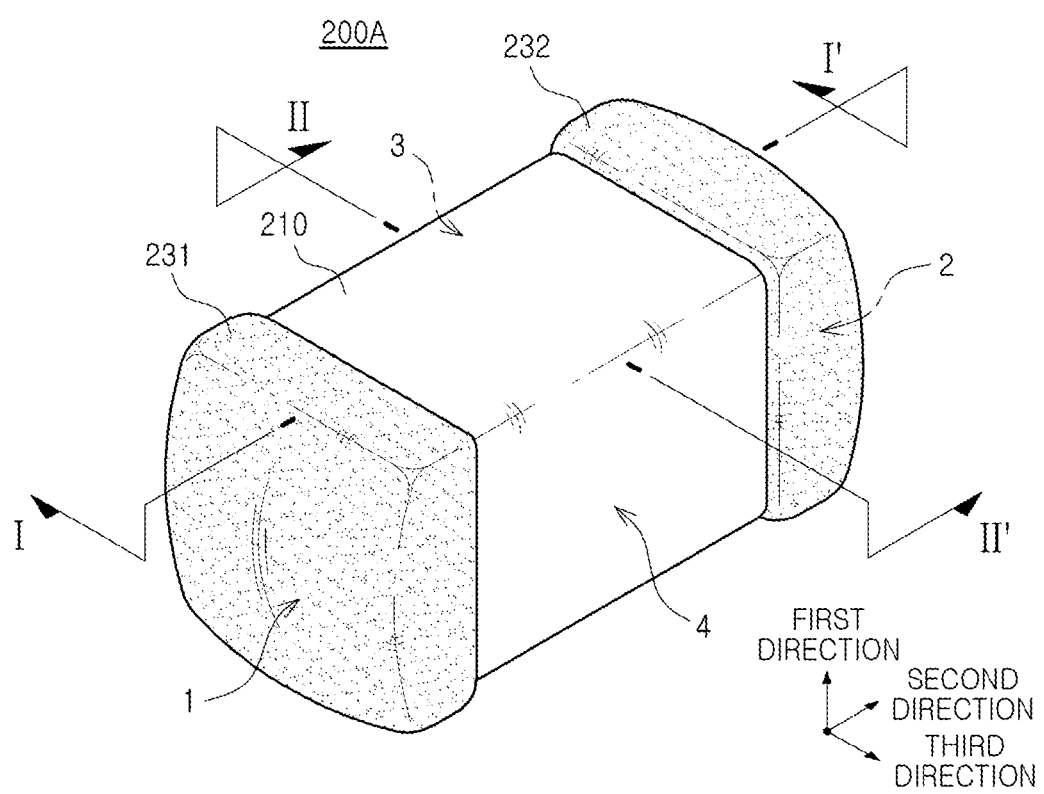
FIG. 14 is a perspective view schematically illustrating a multilayer electronic component according to an embodiment.

FIG. 14 is a perspective view schematically illustrating a multilayer electronic component according to an embodiment.

Figure 15:
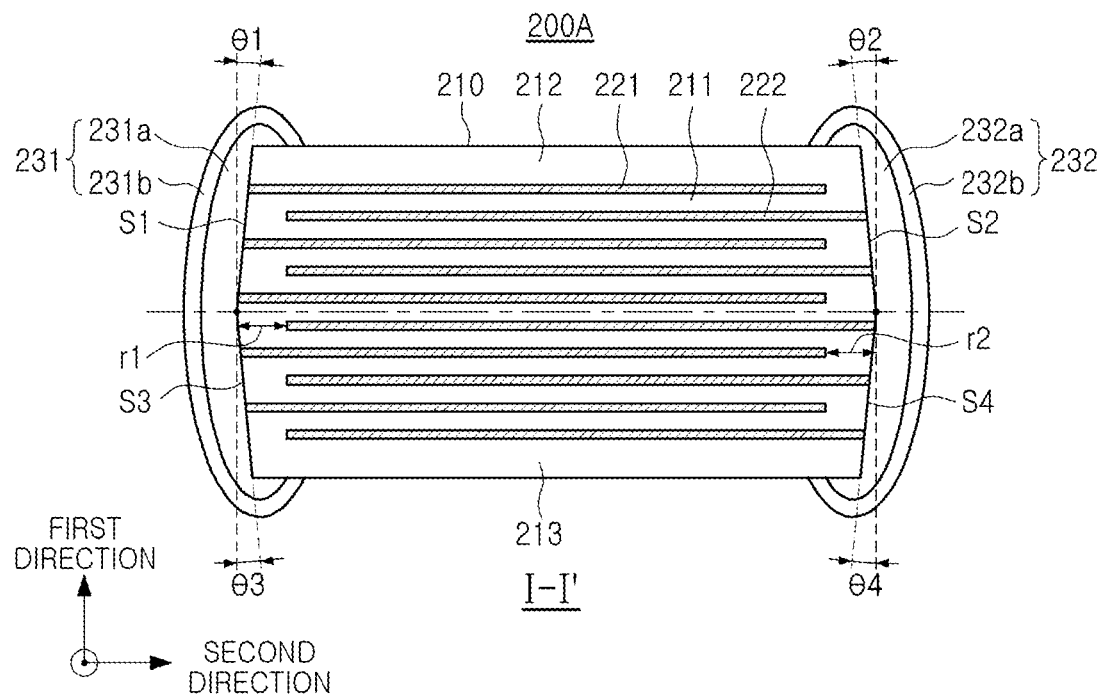
FIG. 15 is a cross-sectional view taken along line I-I' of FIG. 14.

FIG. 15 is a cross-sectional view taken along line I-I' of FIG. 14.

Figure 16:
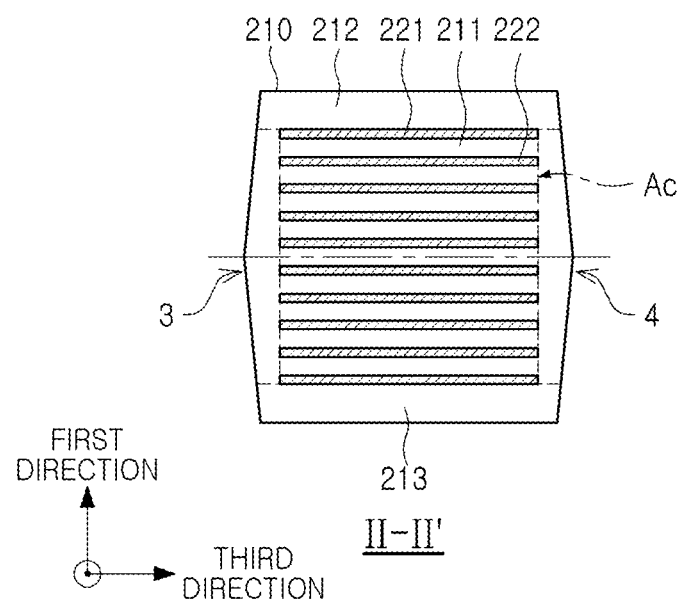
FIG. 16 is a cross-sectional view taken along line II-II' of FIG. 14.

FIG. 16 is a cross-sectional view taken along line II-II' of FIG. 14.

Referring to FIGS. 14 to 16, a multilayer electronic component 200A according to an embodiment includes a ceramic body 210 including a dielectric layer 211 and internal electrodes 221 and 222, and external electrodes 231 and 232 connected to the internal electrodes 221 and 222.

The ceramic body 210 may include a first side 1 and a second side 2 opposing in the second direction, a third side 3 and a fourth side 4 connected to the first and second sides and opposing each other in the third direction. The first to fourth sides 1, 2, 3, and 4 may be connected to the upper and lower surfaces of the ceramic body 210 opposing in the first direction.

In the ceramic body 210, the dielectric layer 211 and the internal electrodes 221 and 222 may be alternately stacked. The plurality of dielectric layers 211 forming the ceramic body 210 are in a fired state, and the boundary between the adjacent dielectric layers 211 may be integrated to the extent that it is difficult to check without using a scanning electron microscope (SEM).

The average thickness of the dielectric layers 211 do not need to be particularly limited. For example, the average thickness of the dielectric layer 211 may be 0.4 μm or less to obtain miniaturization and high capacitance of the multilayer electronic component 200A, but the present disclosure is not limited thereto.

In this case, the average thickness of the dielectric layer 211 may indicate the average thickness of the dielectric layers 211 disposed between the internal electrodes 221 and 222. The average thickness of the dielectric layer 211 may be measured by scanning cross-sections of the ceramic body 210 in the first and second directions with a scanning electron microscope (SEM) with a magnification of 10,000. In detail, the average value may be measured by measuring the thickness at a plurality of points of one dielectric layer 211, for example, at 30 points equally spaced in the second direction. The 30 points at equal intervals may be designated in a capacitance forming portion Ac to be described later. In addition, when the average value is measured by extending the measurement of the average value to ten dielectric layers 211, the average thickness of the dielectric layer 211 may be more generalized.

The internal electrodes 221 and 222 may be alternately disposed with the dielectric layer 211. For example, the first internal electrode 221 and the second internal electrode 222, which are a pair of electrodes having different polarities, may be disposed to face each other with the dielectric layer 211 interposed therebetween. For example, the plurality of first internal electrodes 221 and the plurality of second internal electrodes 222 may be electrically isolated from each other by the dielectric layer 211 disposed therebetween.

The plurality of first internal electrodes 221 may extend to the first side 1 of the ceramic body 210, and the plurality of second internal electrodes 222 may extend to the second side 2 of the ceramic body 210. In more detail, the plurality of first internal electrodes 221 may be connected to the first side 1 of the ceramic body 210, and the plurality of second internal electrodes 222 may be connected to the second side 2 of the ceramic body 210. Also, the plurality of first and second internal electrodes 221 and 222 may be disposed to be spaced apart from the third and fourth sides 3 and 4 of the ceramic body 210.

The conductive metal included in the internal electrodes 221 and 222 may be at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The average thickness of the internal electrodes 221 and 222 does not need to be particularly limited. For example, the average thickness of the internal electrodes 221 and 222 may be 0.4 μm or less to obtain miniaturization and high capacitance of the multilayer electronic component 200A, but the present disclosure is not limited thereto.

In this case, the average thickness of the internal electrodes 221 and 222 may be measured by scanning the cross-sections of the ceramic body 210 in the first and second directions with a scanning electron microscope (SEM) with a magnification of 10,000. In more detail, the average value may be measured by measuring the thickness at a plurality of points of one internal electrode 221 or 222, for example, at 30 points equally spaced in the second direction. The 30 points at equal intervals may be designated in the capacitance forming portion Ac, to be described later. Also, when the average value is measured by extending the measurement of the average value to the ten internal electrodes 221 and 222, the average thickness of the internal electrodes 221 and 222 may be further generalized.

According to an embodiment, since the cutting path may be set in consideration of the deformation of the ceramic laminate 100 through the laser, a deviation between a separation distance r1 from one end of the second internal electrode 222 to the first side 1 of the ceramic body 210 and a separation distance r2 from one end of the first internal electrode 221 to the second side 2 of the ceramic body 210 may be uniformly controlled.

The ceramic body 210 may include a capacitance forming portion Ac disposed inside the ceramic body and including a plurality of first internal electrodes 221 and a plurality of second internal electrodes 222 disposed to face each other with the dielectric layer 211 interposed therebetween to form capacitance, and a first cover portion 212 and a second cover portion 213 disposed on both surfaces of the capacitance forming portion Ac, opposing each other in the first direction, respectively. The cover parts 212 and 213 may basically serve to prevent damage to the internal electrode due to physical or chemical stress. The cover parts 212 and 213 may have the same configuration as the dielectric layer 211 except that they do not include internal electrodes.

The average thickness of the cover portions 212 and 213 does not need to be particularly limited. However, the average thickness of the cover parts 212 and 213 may be 20 µm or less to reduce the size and increase the capacitance of the multilayer electronic component 200A. In this case, the average thickness of the cover parts 212 and 213 indicates the average thickness of each of the first cover part 212 and the second cover part 213. The average thickness of the cover parts 212 and 213 refers to the length of the cover parts 212 and 213 in the first direction, and may be a value obtained by averaging the lengths in the first direction measured at five equally spaced points in the cross section of the ceramic body 210 in the first direction and the second direction.

The ceramic body 210 may further include a margin portion disposed on a side surface of the capacitance forming portion Ac in the third direction. The margin portion may be disposed on the third side and the fourth side of the ceramic body 210, and the margin portion may refer to a region between both ends of the internal electrodes 221 and 222 and the boundary surface of the ceramic body 210 in a cross section of the ceramic body 210 cut in the first direction and the third direction. The margin portion may basically serve to prevent damage to the internal electrodes 221 and 222 due to physical or chemical stress. The margin portion may be formed by forming the internal electrode patterns 121 and 122 by applying a conductive paste on the ceramic green sheet 111 except where the margin portion is to be formed.

The external electrodes 231 and 232 may be disposed on the first and second sides 1 and 2 of the ceramic body 210 to extend to a portion of each of the third and fourth sides 3 and 4. In addition, the external electrodes 231 and 232 may extend to the upper and lower surfaces of the ceramic body 210 opposing each other in the first direction. The external electrodes 231 and 232 may include a first external electrode 231 and a second external electrode 232 connected to the plurality of first internal electrodes 221 and the plurality of second internal electrodes 222, respectively.

The external electrodes 231 and 232 may be formed using any material as long as it has electrical conductivity, such as a metal. A specific material thereof may be determined in consideration of electrical properties, structural stability, or the like. Furthermore, the external electrodes 231 and 232 may have a multi-layered structure. For example, the external electrodes 231 and 232 may include a conductive metal, and the conductive metal included in the external electrodes 231 and 232 may include copper (Cu), nickel (Ni), palladium (Pd), platinum (Pt), gold (Au), silver (Ag), lead (Pb), and/or alloys including the same.

The external electrodes 231 and 232 may include first electrode layers 231a and 232a disposed on the first and second sides 1 and 2 of the ceramic body 210 and respectively connected to the first and second internal electrodes 221 and 222, and second electrode layers 231b and 232b disposed on the first electrode layers 231a and 232a.

The first electrode layers 231a and 232a may be formed by dipping the first and second sides 1 and 2 of the ceramic body 210 in a conductive paste for external electrodes, including conductive metal and glass, and then firing the same. Alternatively, the first electrode layers 231a and 232a may be formed by transferring a sheet including a conductive metal and glass. Accordingly, the first electrode layers 231a and 232a may be fired electrodes including a conductive metal and glass.

In addition, the first electrode layers 231a and 232a may be, for example, resin-based electrodes including a conductive metal and a resin. The first electrode layers 231a and 232a may be formed by applying and curing a paste including a conductive metal and a resin.

The conductive metal included in the first electrode layers 231a and 232a may include copper (Cu), nickel (Ni), palladium (Pd), platinum (Pt), gold (Au), silver (Ag), lead (Pb), and/or or alloys including the same, but the present disclosure is not limited thereto.

The second electrode layers 231b and 232b may improve mounting characteristics. The type of the second electrode layers 231b and 232b are not particularly limited, and may be a plating layer including nickel (Ni), tin (Sn), palladium (Pd) and/or alloys containing the same, and may be formed in a plurality of layers. The second electrode layers 231b and 232b may be, for example, a nickel (Ni) plating layer or a tin (Sn) plating layer, and may have a form in which a nickel (Ni) plating layer and a tin (Sn) plating layer are sequentially formed. In addition, the second electrode layers 231b and 232b may include a plurality of nickel (Ni) plating layers and/or a plurality of tin (Sn) plating layers.

Although the drawing illustrates a structure in which the multilayer electronic component 200A has two external electrodes 231 and 232, the present disclosure is not limited thereto. The number or shape of the external electrodes 231 and 232 may be changed according to the shape of the internal electrodes 221 and 222 or other uses.

The ceramic body 210 of the multilayer electronic component 200A according to an embodiment may include a plurality of inclined surfaces S1 and S3 formed on the first side 1 and inclined with respect to the first direction, and a plurality of inclined surfaces S2 and S4 formed on the second side 2 and inclined with respect to the first direction. In detail, the ceramic body 210 may include the first inclined surface S1 and the second inclined surface S2 formed on the first side 1 and the second side 2, respectively, and connected to the upper surface of the ceramic body 210, and the third inclined surface S3 and the fourth inclined surface S4 formed on the first and second sides 1 and 2 respectively and connected to the lower surface of the ceramic body 210.

As described above, the method of manufacturing a multilayer electronic component according to an embodiment may include irradiating a laser onto the ceramic laminate. In this case, the laser has the smallest processing line width at the focal point, and has the processing line width increasing as it moves away from the focal point. Accordingly, the cutting surface by the laser may be inclined with respect to the first direction.

In addition, since the method of manufacturing a multilayer electronic component according to an embodiment includes irradiating a laser onto one surface and the other surface of the ceramic laminate, respectively, the ceramic body 210 may include a plurality of inclined surfaces S1 and S3 formed on the first side 1 and a plurality of inclined surfaces S2 and S4 formed on the second side 2.

As described above, in a case in which the laser is irradiated to only one surface of the ceramic laminate, cross-sections of the ceramic body in the first direction and the second direction may have an overall trapezoidal shape as the processing line width increases. However, in the case in which the cross-sections of the ceramic body in the first direction and the second direction have a trapezoidal shape, external electrodes are not uniformly formed on the surface of the ceramic body, and accordingly, the reliability of the multilayer electronic component may be deteriorated.

On the other hand, in the multilayer electronic component 200A according to an embodiment, as the ceramic body 210 includes the plurality of inclined surfaces S1, S2, S3 and S4 formed on the first and second sides 1 and 2, the cross-section of the ceramic body 210 in the first direction and the second direction may have a hexagonal shape as a whole, and accordingly, the external electrodes 231 and 232 may be uniformly formed on the upper and lower portions of the first and second sides 1 and 2 of the ceramic body 210.

Due to the structural features of the ceramic body 210 including the plurality of inclined surfaces S1, S2, S3, and S4, the length of the ceramic body 210 in the second direction may increase from the upper and lower portions toward the central portion in the first direction.

The plurality of inclined surfaces S1, S2, S3, and S4 of the ceramic body 210 may be substantially planar. In this case, "substantially planar" means that most of the inclined surfaces S1, S2, S3, and S4 are flat, but may also have a somewhat non-planar area, and may also mean to include a somewhat concave-convex shape or to include a region that is partially inclined. However, the present disclosure is not limited thereto, and as will be described later, the plurality of inclined surfaces may be curved surfaces.

Since the plurality of inclined surfaces included in the ceramic body 210 may be formed by a manufacturing method of irradiating a laser onto one surface and the other surface of the ceramic laminate, respectively, the ceramic body 210 may further include a plurality of inclined surfaces formed on the third and fourth sides 3 and 4, respectively, and inclined with respect to the first direction.

In FIG. 15, the ceramic body 210 is illustrated as including two inclined surfaces respectively formed on the first side and the second side 1 and 2, but the present disclosure is not limited thereto. For example, by adjusting parameters of the laser device 300, the ceramic body 210 may include three or more inclined surfaces respectively formed on the first side and the second side 1 and 2.

The angle between the first to fourth inclined surfaces S1, S2, S3, and S4 and the first direction does not need to be particularly limited. For example, angles θ1 and θ3 between the first and third inclined surfaces S1 and S3 formed on the first side 1 of the ceramic body 210 and the first direction are 3° or less, respectively, and angles θ2 and θ4 between the second and fourth inclined surfaces S2 and S4 formed on the second side of the ceramic body 210 and the first direction may be 3° or less, respectively. The overall shape of the ceramic body 210 may be controlled by adjusting the angles θ1, θ2, θ3, and θ4 between the inclined surfaces and the first direction to 3° or less.

The angles θ1, θ2, θ3, and θ4 between the inclined surfaces and the first direction may be controlled by adjusting the parameters of the laser device 300, and may be greater than 0°. The angles θ1, θ2, θ3, and θ4 between the inclined surfaces and the first direction may be the same or different from each other. In addition, as will be described later, when the plurality of inclined surfaces S1, S2, S3, and S4 are curved surfaces, a maximum value of an angle between an arbitrary region within the inclined surfaces S1, S2, S3, and S4 and the first direction may be 3° or less.

In an embodiment, the plurality of inclined surfaces S1, S2, S3, and S4 formed on the first and second sides 1 and 2 of the ceramic body 210 may include irregularities. The irregularities may be formed by a laser irradiated by the laser device 300, and accordingly, the contact area and adhesion strength between the ceramic body 210 and the external electrodes 231 and 232 may be improved.

FIGS. 17 to 26 are modified examples of FIG. 15.

Figure 17:
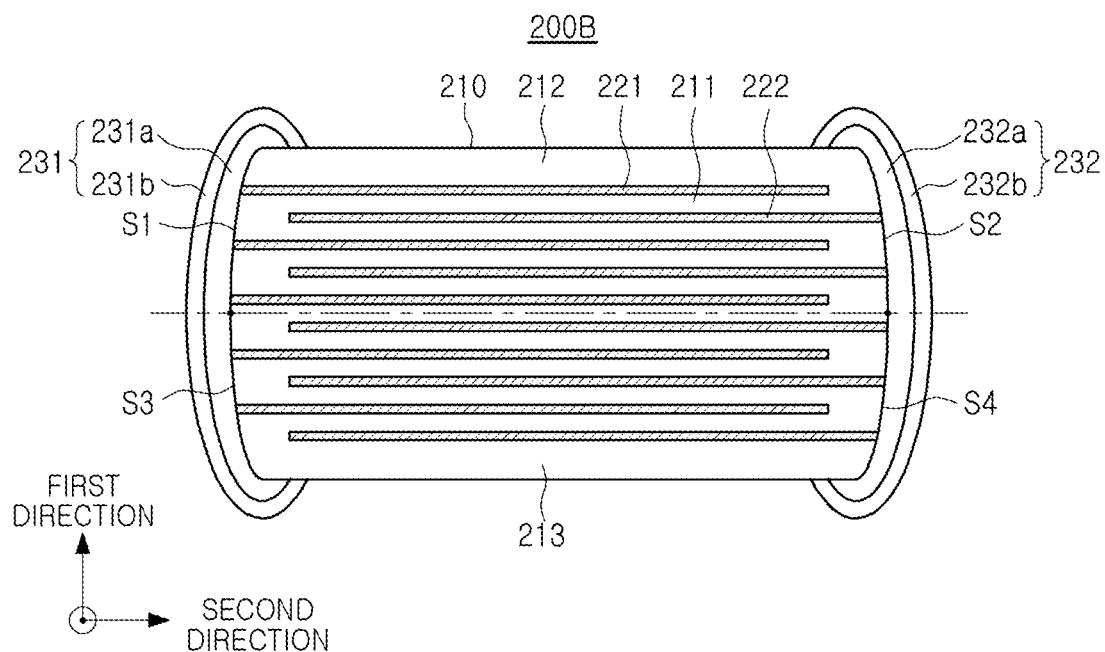
FIGS. 17 to 26 are modified examples of FIG. 15.

In multilayer electronic components 200B and 200C according to embodiments, inclined surfaces formed on the first and second sides 1 and 2 of the ceramic body 210 may be curved. For example, as illustrated in FIG. 17, the ceramic body 210 of the multilayer electronic component 200B may include a plurality of inclined surfaces S1, S2, S3 and S4 formed on the first side and the second side 1 and 2, and the inclined surfaces may be curved surfaces convex with respect to the second direction.

Figure 18:
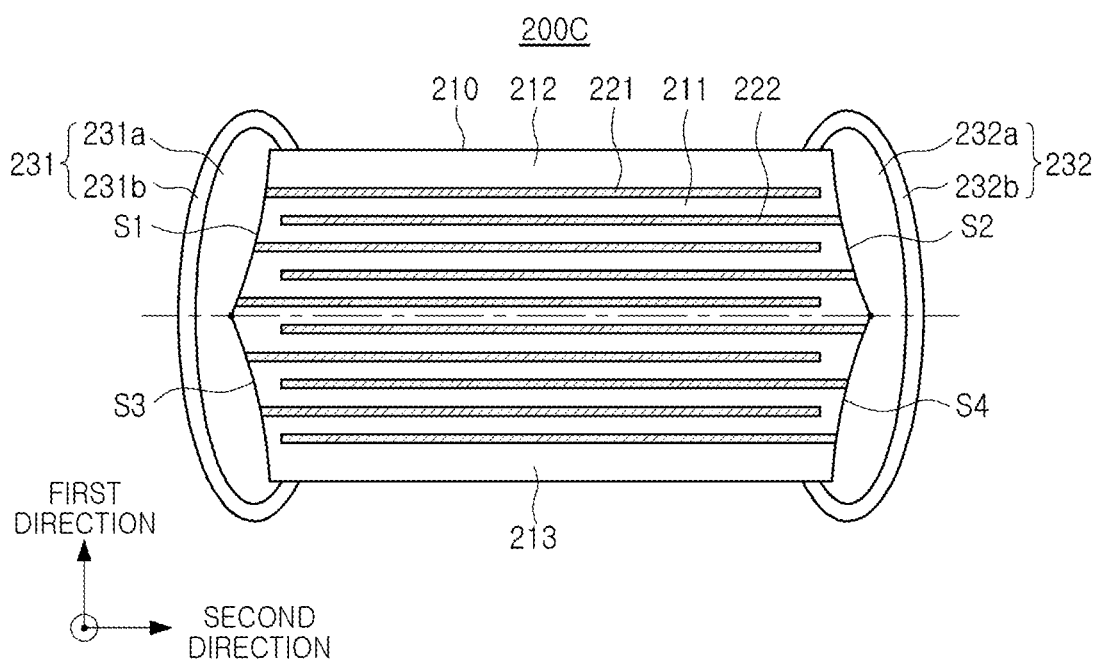

However, as in the modified example of FIG. 18, the ceramic body 210 of the multilayer electronic component 200C includes a plurality of inclined surfaces S1, S2, S3 and S4 formed on the first side and the second side 1 and 2, and the inclined surfaces may be curved surfaces concave with respect to the second direction. In the plurality of inclined surfaces S1 and S2 on the first side 1, at least a portion of the regions connected to each other may be a discontinuous region, and in the plurality of inclined surfaces S3 and S4 on the second side 2, at least a portion of the regions connected to each other may be a discontinuous region. In this case, the region in which the inclined surfaces S1, S2, S3, and S4 are connected may be a structure that may be obtained by applying the above-described process, for example, a laser cutting process for one surface and the other surface of the ceramic laminate 100, and the regions connected according to the cutting method may be in the form of points, lines, planes, or combinations thereof. In addition, the above-described discontinuous region may be defined as the form in which inclined lines in both directions are not continuous with respect to the connection region in one cross-section of the ceramic body 210.

When the plurality of inclined surfaces S1, S2, S3, and S4 respectively formed on the first and second sides 1 and 2 of the ceramic body 210 are curved surfaces, a contact area between the ceramic body 210 and the external electrodes 231 and 232 may be improved. Accordingly, the bonding strength between the ceramic body 210 and the external electrodes 231 and 232 may be improved.

The plurality of inclined surfaces S1, S2, S3, and S4 may be formed as curved surfaces convex with respect to the second direction as the power density of the laser irradiated to the ceramic laminate is gradually decreased. In addition, the plurality of inclined surfaces S1, S2, S3, and S4 may be formed as curved surfaces concave with respect to the second direction as the power density of the laser irradiated to the ceramic laminate is gradually increased, but the present disclosure is not limited thereto. In this case, the curvatures of the inclined surfaces S1, S2, S3, and S4 may be the same or different from each other.

Figure 19:
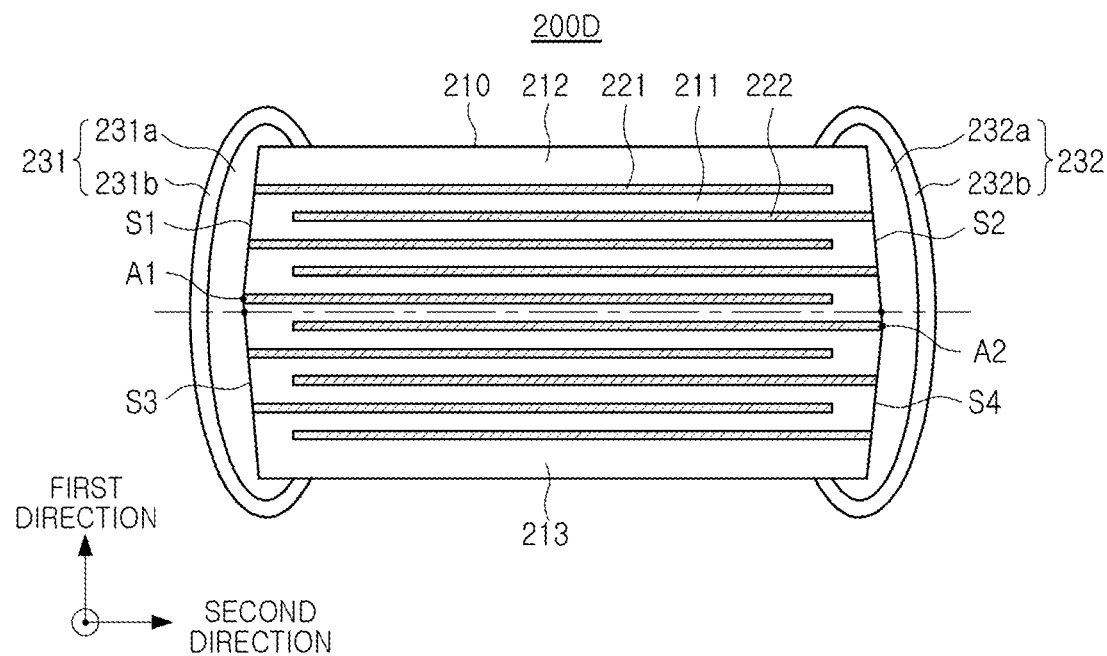
Figure 20:
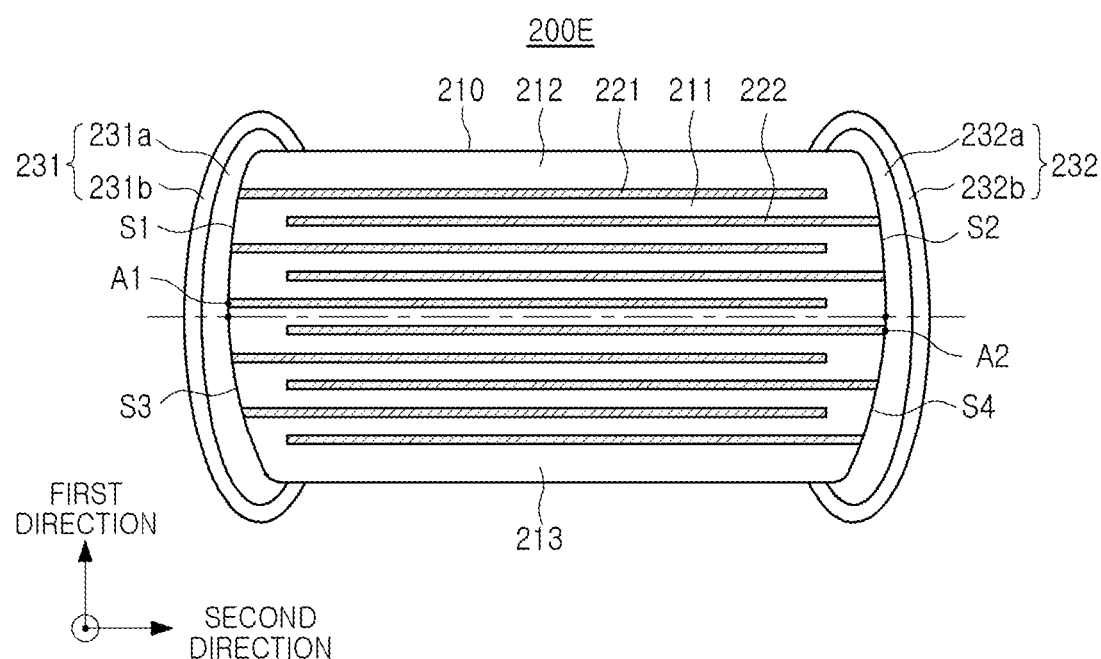
Figure 21:
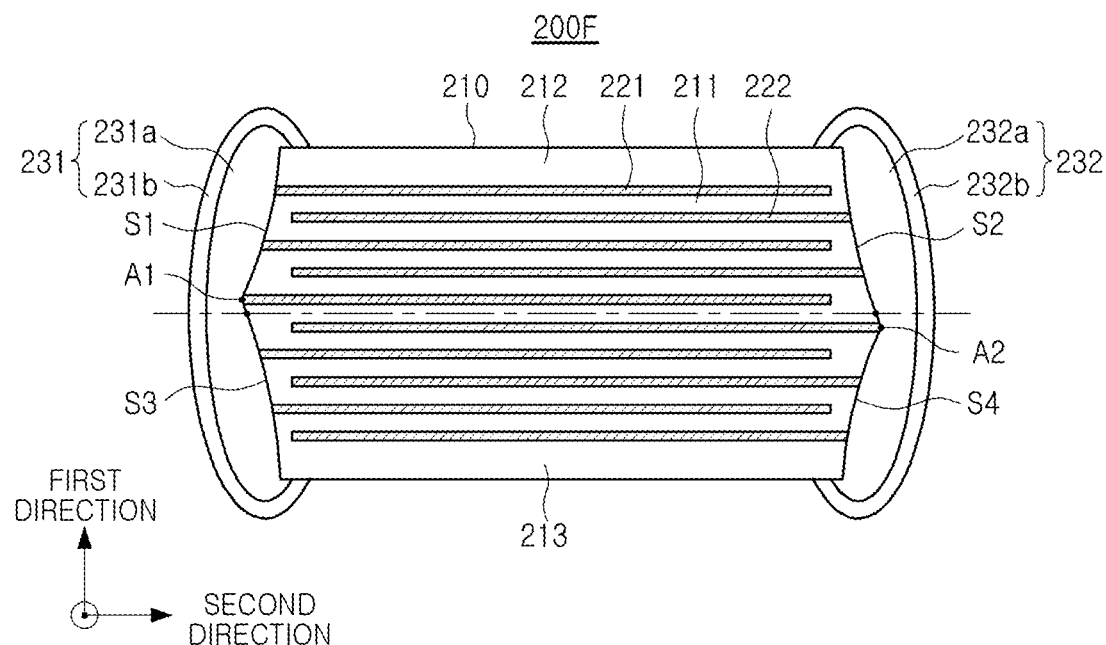

Referring to FIGS. 19 to 21, in multilayer electronic components 200D, 200E, and 200F according to embodiments, a first connection region A1 in which a plurality of inclined surfaces S1 and S3 of the first side 1 of the ceramic body 210 are connected to each other and a second connection region A2 in which a plurality of inclined surfaces S2 and S4 of the second side 2 of the ceramic body 210 are connected to each other may be located on different levels with respect to the first direction.

In general, the ceramic green sheet 111 forming the dielectric layer 211 may have a higher processing rate by the laser than the internal electrode patterns 121 and 122 forming the inner electrodes 221 and 222. Accordingly, the lasers respectively irradiated to one surface and the other surface of the ceramic laminate 100 may tend to travel to a point at which the internal electrode patterns 121 and 122 are disposed based on the first direction. Therefore, the first connection region A1 in which the plurality of inclined surfaces S1 and S3 of the first side 1 of the ceramic body 210 are connected, and the second connection region A2 in which the plurality of inclined surfaces S2 and S4 of the second side 2 of the ceramic body 210 are connected may be located on different levels with respect to the first direction. The first connection region A1 may be located on substantially the same level as the first internal electrode 221 with respect to the first direction, and the second connection region A2 may be located on substantially the same level as the second internal electrode 222 with respect to the first direction, but the present disclosure is not limited thereto.

The first and second connection regions A1 and A2 may be discontinuous areas. And as illustrated, at least one of the first and second connection regions A1 and A2 may be disposed in a position offset in the first direction from the center of the ceramic body 210 in the first direction. FIG. 19 illustrates an example in which both the first and second connection regions A1 and A2 are positioned to be offset from the center of the ceramic body 210 in the first direction. In this case, the first and second connection regions A1 and A2 may be disposed in positions offset in opposite directions from the center of the ceramic body 210 in the first direction. Also, the distance between the first and second connection regions A1 and A2 in the first direction may be greater than or equal to the average thickness of the dielectric layer 211, for example, 0.4 μm.

Figure 22:
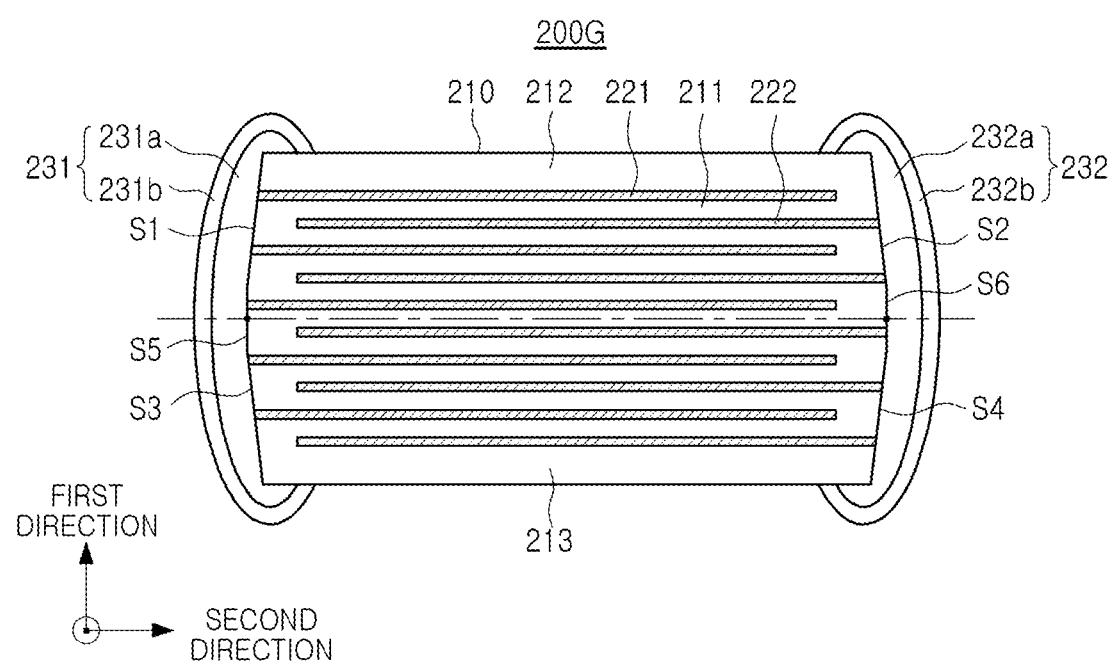
Figure 23:
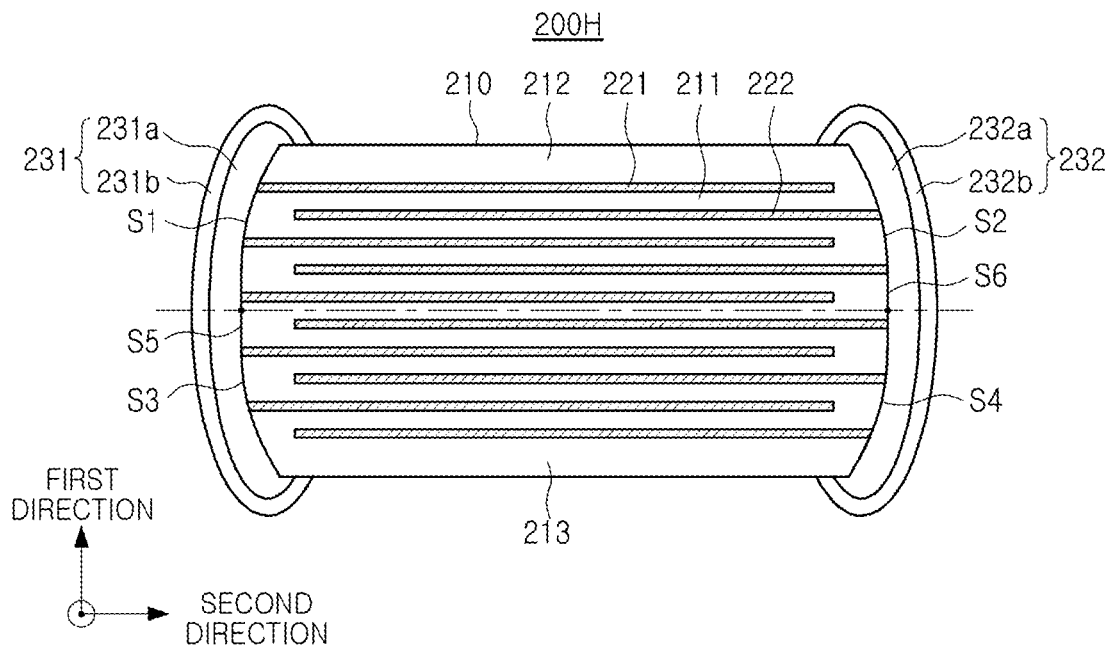
Figure 24:
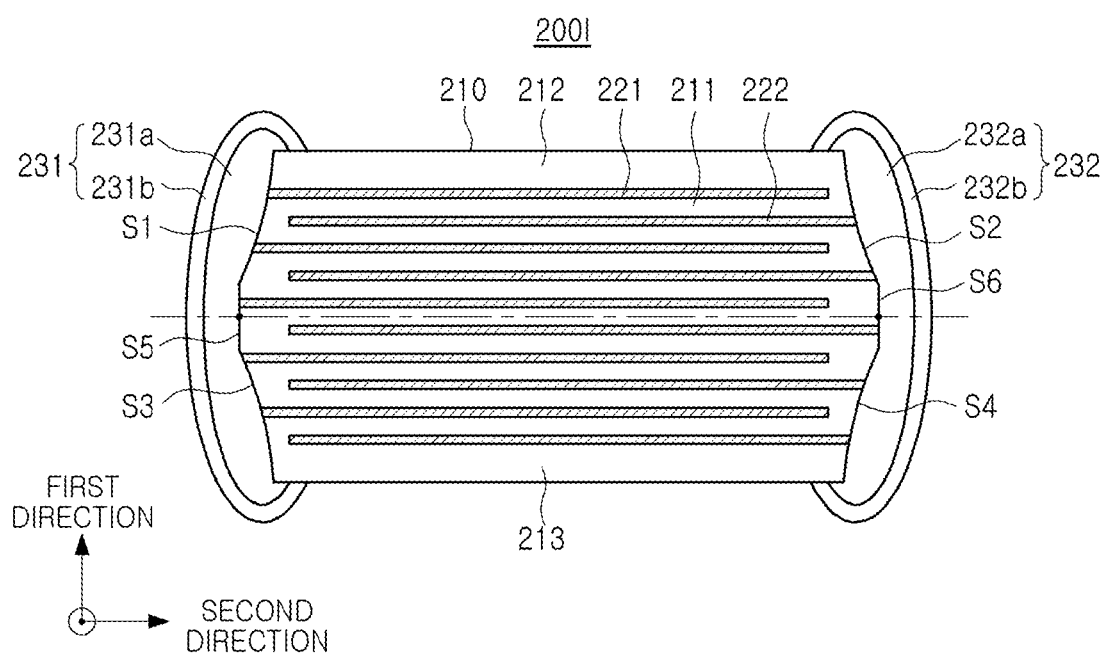

Referring to FIGS. 22 to 24, the ceramic body 210 of multilayer electronic component 200G, 200H, and 200I according to embodiments may further include a first connection surface S5 connecting a plurality of inclined surfaces S1 and S3 formed on the first side 1, and a second connection surface S6 connecting a plurality of inclined surfaces S2 and S4 formed on the second side 2. Unlike the plurality of inclined surfaces S1, S2, S3, and S4, the connection surfaces S5 and S6 may not be inclined in the first direction, but the present disclosure is not limited thereto.

In the case of a method of manufacturing a multilayer electronic component according to an embodiment, the ceramic laminate 100 may be completely cut by a laser, but the present disclosure is not limited thereto. For example, after forming a scribing line by cutting a portion of the ceramic laminate 100 by a laser irradiated to one surface and the other surface of the ceramic laminate 100, the ceramic laminate 100 may be cut by applying physical force in the first direction. For example, the plurality of inclined surfaces S1, S2, S3, and S4 respectively formed on the first and second sides 1 and 2 of the ceramic body 210 may be formed by a laser, and the connection surfaces S5 and S6 respectively formed on the first side and the second side 1 and 2 may be formed by cutting the ceramic laminate 100 by a physical force.

Figure 25:
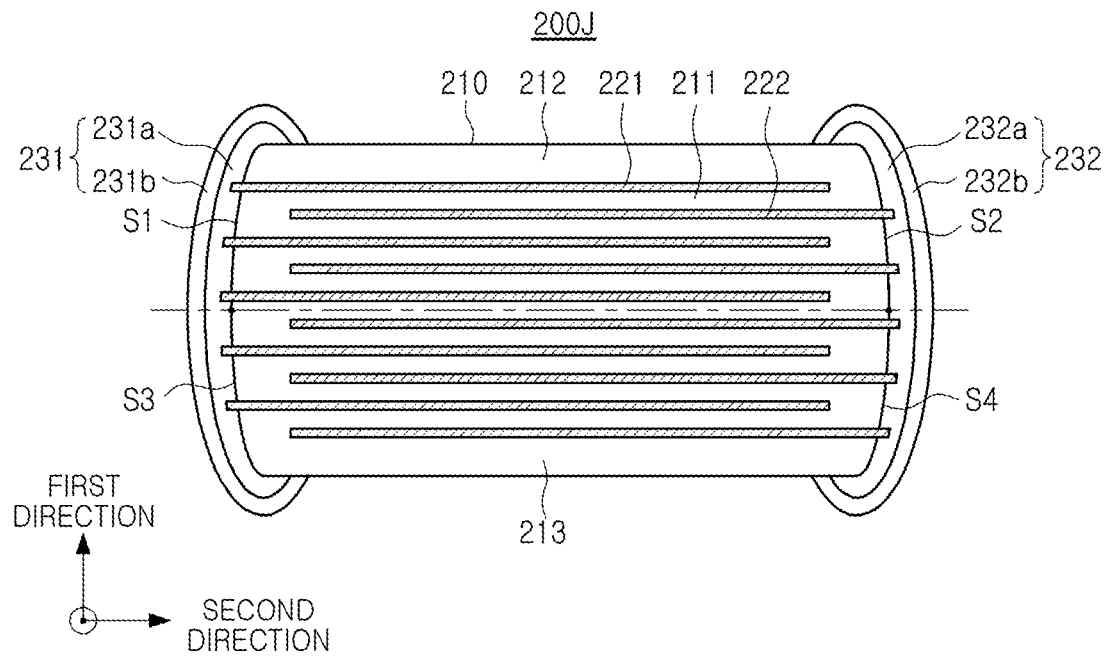

Referring to FIG. 25, in a multilayer electronic component 200J according to an embodiment, the first internal electrode 221 may protrude through the first side 1 of the ceramic body 210, and the second internal electrode 222 may protrude through the second side 2 of the ceramic body 210. Accordingly, a contact area between the internal electrodes 221 and 222 and the external electrodes 231 and 232 may be improved.

The internal electrodes 221 and 222 may protrude toward the first and second sides 1 and 2 of the ceramic body 210, for example, by adjusting the wavelength of the laser irradiated to the ceramic laminate 100. In detail, by irradiating the ceramic laminate 100 with a laser having a wavelength within a range in which the absorption rate of the ceramic component is higher than the absorption rate of the metal component, the dielectric layer 211 may be further removed compared to the internal electrodes 221 and 222, and as a result, the internal electrodes 221 and 222 may protrude toward the first and second sides 1 and 2 of the ceramic body 210, but the present disclosure is not limited thereto.

Figure 26:
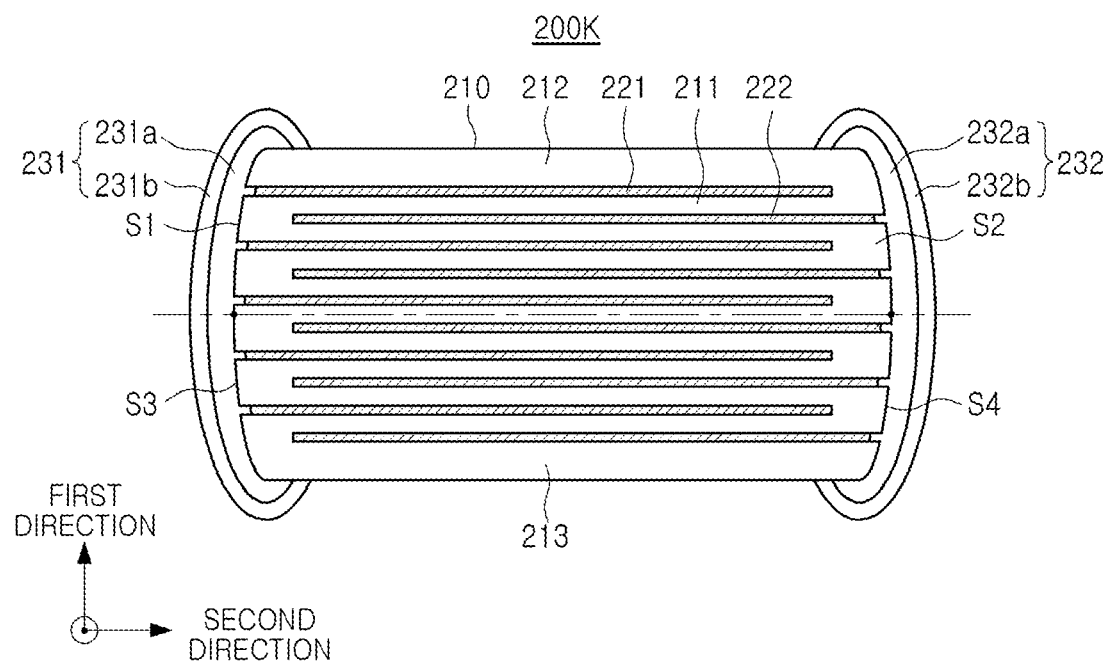

Referring to FIG. 26, in a multilayer electronic component 200K according to an embodiment, the first internal electrode 221 may be disposed to be spaced apart from the first side 1 of the ceramic body 210, and the second internal electrode 222 may be disposed to be spaced apart from the second side 2 of the ceramic body 210.

As described above, by irradiating the ceramic laminate 100 with a laser having a wavelength within a range in which the absorption rate of the metal component is higher than the absorption rate of the ceramic component, the internal electrodes 221 and 222 may be further removed compared to the dielectric layer 211, and as a result, the internal electrodes 221 and 222 may be disposed to be spaced apart from the first and second sides 1 and 2 of the ceramic body 210, but the present disclosure is not limited thereto.

Figure 27:
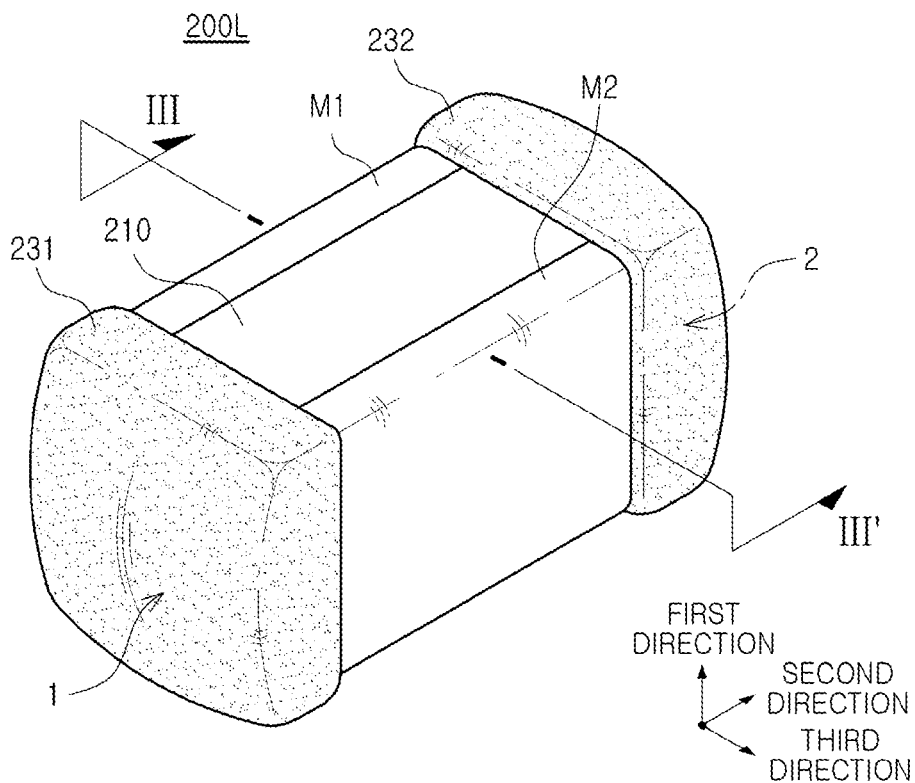
FIG. 27 is a modification of FIG. 14.
Figure 28:
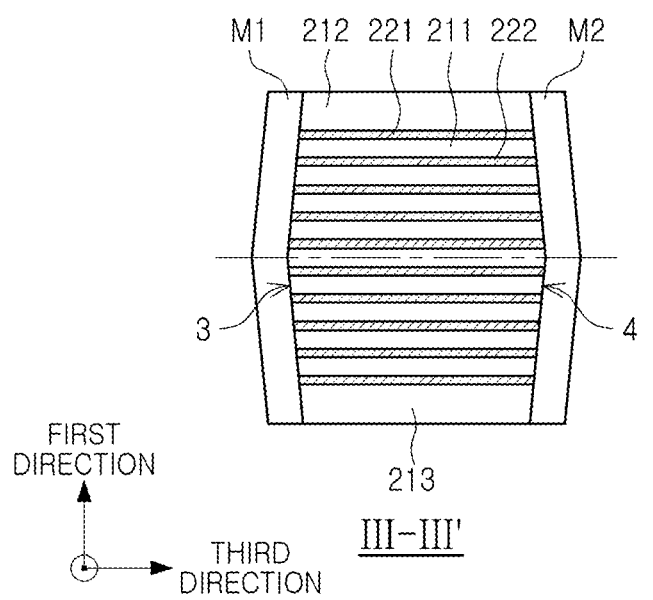
FIG. 28 is a cross-sectional view taken along line III-III' of FIG. 27.

FIG. 27 is a modification of FIG. 14. FIG. 28 is a cross-sectional view taken along line III-III' of FIG. 27.

Referring to FIGS. 27 and 28, in a multilayer electronic component 200L according to an embodiment, the first internal electrode 221 is disposed to be connected to the first side 1, the third side 3, and the fourth side 4 of the ceramic body 210, the second internal electrode 222 is disposed to be connected to the second side 2, the third side 3, and the fourth side 4 of the ceramic body 210, and side margin portions M1 and M2 may be disposed on the third and fourth sides 3 and 4 of the ceramic body 210. In more detail, the side margin portions M1 and M2 may include a first side margin portion M1 disposed on the third side 3 of the ceramic body 210, and a second side margin portion M2 disposed on the fourth side 4 of the ceramic body 210.

For example, the internal electrodes 221 and 222 may be connected to the side margin portions M1 and M2 on the third and fourth sides 3 and 4 of the ceramic body 210. In addition, the side margin portions M1 and M2 may be formed by cutting after lamination such that the internal electrodes 221 and 222 are connected to the third and fourth sides 3 and 4 of the ceramic body 210 to thus suppress the step difference caused by the internal electrodes 221 and 222, and then stacking a dielectric layer 211 on the third and fourth sides 3 and 4 of the ceramic body 210, but the present disclosure is not limited thereto.

The internal electrodes 221 and 222 of the multilayer electronic component 200L according to an embodiment may be formed by firing the above-described stripe-shaped internal electrode patterns 121' and 122', and the ceramic body 210 of the multilayer electronic component 200L may be formed by firing the multilayer chip 110' of FIG. 12 described above.

The above descriptions related to the inclined surfaces S1, S2, S3, and S4 described with reference to FIGS. 17-26 may be also applied to inclined surfaces on the third and fourth sides 3 and 4 shown in FIG. 28. To avoid redundancy, detailed descriptions are omitted.

As set forth above, according to an embodiment, cutting defects due to deformation of the ceramic laminate may be prevented.

Cracks may be prevented from occurring due to shear stress occurring during cutting.

Chip sticking defects may be prevented.

The processing time may be shortened by irradiating the laser on one surface and the other surface of the ceramic laminate, respectively.

Reliability of the multilayer electronic component may be improved by improving the shape of the ceramic body.

The present disclosure is not limited by the above-described embodiment and the accompanying drawings, and is intended to be limited by the appended claims. Accordingly, various forms of substitution, modification and change will be possible by those of ordinary skill in the art within the scope not departing from the technical spirit of the present disclosure described in the claims, and this will also fall within the scope of the present disclosure.

In addition, the expression 'an/one embodiment' does not mean the same embodiment as each other, and is provided to emphasize the respective unique characteristics. However, the embodiments presented above are not excluded from being implemented in combination with the features of another embodiment. For example, even if what is described in one particular embodiment is not described in another embodiment, it may be understood as a description related to another embodiment, unless there is a description contradictory thereto.

While embodiments have been shown and described above, it will be apparent to those skilled in the art that modifications and variations could be made without departing from the scope of the present disclosure as defined by the appended claims.

What is claimed is:

1. A multilayer electronic component comprising:
   a ceramic body including a dielectric layer and a plurality of first and second internal electrodes stacked in a first direction with the dielectric layer interposed therebetween; and
   first and second external electrodes connected to the first and second internal electrodes, respectively,
   wherein the first and second internal electrodes extend to a first side and a second side of the ceramic body, respectively,
   wherein the ceramic body includes a plurality of curved surfaces disposed on the first side and a plurality of curved surfaces disposed on the second side,
   wherein curvature of the plurality of curved surfaces disposed on the first and second sides is along the first direction,
   wherein at least a portion of regions connected to each other in the plurality of curved surfaces on the first side is a discontinuous region, and at least a portion of regions connected to each other in the plurality of curved surfaces on the second side is a discontinuous region.

2. The multilayer electronic component of claim 1, wherein a first connection region in which the plurality of curved surfaces of the first side of the ceramic body are connected and a second connection region in which the plurality of curved surfaces of the second side of the ceramic body are connected are located on different levels, based on the first direction.

3. The multilayer electronic component of claim 2, wherein the first side and the second side of the ceramic body oppose in a second direction, perpendicular to the first direction,
   wherein the ceramic body has a length in the second direction, increasing from upper and lower portions toward a central portion in the first direction.

4. The multilayer electronic component of claim 1, wherein the plurality of curved surfaces disposed on the first side and the plurality of curved surfaces disposed on the second side include irregularities.

5. The multilayer electronic component of claim 1, wherein the ceramic body further includes a first connection surface connecting the plurality of curved surfaces disposed on the first side, and a second connection surface connecting the plurality of curved surfaces disposed on the second side.

6. The multilayer electronic component of claim 1, wherein the first internal electrode protrudes toward the first side of the ceramic body, and
   the second internal electrode protrudes toward the second side of the ceramic body.

7. The multilayer electronic component of claim 1, wherein the first internal electrode is spaced apart from the first side of the ceramic body, and
   the second internal electrode is spaced apart from the second side of the ceramic body.

8. The multilayer electronic component of claim 1, wherein the first side and the second side of the ceramic body oppose in a second direction, perpendicular to the first direction, and the ceramic body has a third side and a fourth side opposing in a third direction, perpendicular to the first direction and the second direction, and
   the first internal electrode is disposed to be connected to the first side of the ceramic body, and the second internal electrode is disposed to be connected to the second side of the ceramic body,
   wherein the first and second internal electrodes are spaced apart from the third side and the fourth side of the ceramic body.

9. The multilayer electronic component of claim 1, wherein the first side and the second side of the ceramic body oppose in a second direction, perpendicular to the first direction, and the ceramic body has a third side and a fourth side opposing in a third direction, perpendicular to the first direction and the second direction, and
   the first internal electrode is connected to the first side, the third side and the fourth side of the ceramic body, and the second internal electrode is connected to the second side, the third side and the fourth side of the ceramic body,
   wherein a side margin portion is disposed on the third side and the fourth side of the ceramic body.

10. A multilayer electronic component comprising:
    a ceramic body including a dielectric layer and a plurality of first and second internal electrodes stacked in a first direction with the dielectric layer interposed therebetween; and
    first and second external electrodes connected to the first and second internal electrodes, respectively,
    wherein the first and second internal electrodes extend to first and second sides of the ceramic body, respectively,
    the ceramic body includes a plurality of inclined surfaces disposed on the first side and inclined with respect to the first direction, and a plurality of inclined surfaces disposed on the second side and inclined with respect to the first direction,
    a first connection region in which the plurality of inclined surfaces of the first side of the ceramic body are connected and a second connection region in which the plurality of inclined surfaces of the second side of ceramic body are connected are located on different levels with respect to the first direction,
    an angle between the plurality of inclined surfaces disposed on the first side of the ceramic body and the first direction is 3° or less, respectively, and an angle between the plurality of inclined surfaces disposed on the second side of the ceramic body and the first direction is 3° or less, respectively.

11. The multilayer electronic component of claim 10, wherein the inclined surfaces disposed on the first side and the second side of the ceramic body are curved.

12. The multilayer electronic component of claim 10, wherein the inclined surfaces disposed on the first side and the second side of the ceramic body are substantially planar.

13. The multilayer electronic component of claim 10, wherein the first side and the second side of the ceramic body oppose in a second direction, perpendicular to the first direction,
wherein the ceramic body has a length in the second direction, increasing from upper and lower portions toward a central portion in the first direction.

14. The multilayer electronic component of claim 10, wherein the first and second connection regions are discontinuous regions.

15. The multilayer electronic component of claim 10, wherein at least one of the first and second connection regions is disposed in a position offset in the first direction from a center of the ceramic body in the first direction.

16. The multilayer electronic component of claim 10, wherein the first and second connection regions are disposed in positions offset in directions opposite to each other from a center of the ceramic body in the first direction.

17. The multilayer electronic component of claim 10, wherein a distance in the first direction between the first and second connection regions is greater than or equal to an average thickness of the dielectric layer.

18. The multilayer electronic component of claim 10, wherein a distance between the first and second connection regions in the first direction is greater than or equal to 0.4 µm.

19. A multilayer electronic component comprising:
a ceramic body including a dielectric layer and a plurality of first and second internal electrodes stacked in a first direction with the dielectric layer interposed therebetween; and
first and second external electrodes connected to the first and second internal electrodes, respectively,
wherein the first and second internal electrodes extend to a first side and a second side of ceramic body, respectively,
the ceramic body includes a plurality of inclined surfaces disposed on the first side and inclined with respect to the first direction, and a plurality of inclined surfaces disposed on the second side and inclined with respect to the first direction,
on the first side of the ceramic body, a first connection region that is a discontinuous region in which the plurality of inclined surfaces on the first side are connected is disposed, and on the second side of the ceramic body, a second connection region that is a discontinuous region in which the plurality of inclined surfaces on the second side are connected is disposed,
at least one of the first and second connection regions is disposed in a position offset in the first direction from a center of the ceramic body in the first direction,
an angle between the plurality of inclined surfaces disposed on the first side of the ceramic body and the first direction is 3° or less, respectively, and
an angle between the plurality of inclined surfaces disposed on the second side of the ceramic body and the first direction is 3° or less, respectively.

20. The multilayer electronic component of claim 19, wherein a distance between the first and second connection regions in the first direction is greater than or equal to an average thickness of the dielectric layer.

21. The multilayer electronic component of claim 19, wherein a distance between the first and second connection regions in the first direction is greater than or equal to 0.4 µm.

22. A multilayer electronic component comprising:
a ceramic body including a dielectric layer and a plurality of first and second internal electrodes stacked in a first direction with the dielectric layer interposed therebetween; and
first and second external electrodes disposed on a first side and a second side of the ceramic body opposing each other in a second direction, and connected to the first and second internal electrodes, respectively,
wherein the body includes a third side and a fourth side opposing each other in a third direction,
the first internal electrode is connected to the first side, the third side and the fourth side of the ceramic body, and the second internal electrode is connected to the second side, the third side and the fourth side of the ceramic body, and
the plurality of first and second internal electrodes includes one internal electrode and another internal electrode, the one internal electrode has a length in the second direction shorter than a length in the second direction of the another internal electrode, and the another internal electrode is closer to a center portion of the ceramic body than the one internal electrode in the first direction,
wherein the ceramic body includes a plurality of curved surfaces disposed on the first side and a plurality of curved surfaces disposed on the second side, and
wherein curvature of the plurality of curved surfaces disposed on the first and second sides is along the first direction,
wherein at least a portion of regions connected to each other in the plurality of curved surfaces on the first side is a discontinuous region, and at least a portion of regions connected to each other in the plurality of curved surfaces on the second side is a discontinuous region.

23. The multilayer electronic component of claim 22, wherein the one internal electrode and the another internal electrode are disposed on a same side of the center portion of the ceramic body in the first direction.

24. The multilayer electronic component of claim 22, wherein the ceramic body includes a plurality of inclined surfaces disposed on the third side and inclined with respect to the first direction, and a plurality of inclined surfaces disposed on the fourth side and inclined with respect to the first direction.

25. The multilayer electronic component of claim 22, wherein the ceramic body has a length in the third direction, increasing from upper and lower portions toward a central portion in the first direction.

* * * * *